United States Patent
Wang et al.

(10) Patent No.: US 11,835,054 B2
(45) Date of Patent: Dec. 5, 2023

(54) METHOD FOR AUTOMATIC DETECTION OF AXIAL COOLING FAN ROTATION DIRECTION

(71) Applicant: Dassault Systemes Simulia Corp., Johnston, RI (US)

(72) Inventors: Huhu Wang, Livonia, MI (US); Edward Dean Tate, Jr., Grand Blanc, MI (US); Karthik Mahadevan Muthuraman, Livonia, MI (US); Satheesh Kandasamy, Waltham, MA (US)

(73) Assignee: Dassault Systemes Simulia Corp., Johnston, RI (US)

( * ) Notice: Subject to any disclaimer, the term of this patent is extended or adjusted under 35 U.S.C. 154(b) by 454 days.

(21) Appl. No.: 16/829,247

(22) Filed: Mar. 25, 2020

(65) Prior Publication Data
US 2021/0115935 A1    Apr. 22, 2021

Related U.S. Application Data

(60) Provisional application No. 62/916,313, filed on Oct. 17, 2019.

(51) Int. Cl.
*F04D 27/00*    (2006.01)
*F04D 19/00*    (2006.01)
(Continued)

(52) U.S. Cl.
CPC ......... *F04D 27/001* (2013.01); *F04D 19/002* (2013.01); *G06F 30/28* (2020.01);
(Continued)

(58) Field of Classification Search
CPC ...... F04D 27/001; F04D 19/002; G06F 30/28; G06F 2111/10; G06F 2113/08; G06F 2119/08; F05B 2210/40; F05B 2260/84
See application file for complete search history.

(56) References Cited

U.S. PATENT DOCUMENTS

| 5,910,902 A | 6/1999 | Molvig et al. |
| 7,558,714 B2 | 7/2009 | Shan et al. |
| (Continued) | | |

FOREIGN PATENT DOCUMENTS

| CN | 107269583 | 4/2019 |
| JP | 2010-248768 | 11/2010 |
| JP | 2017-072922 | 4/2017 |

OTHER PUBLICATIONS

Weijie Zhang et al., "The influence of axial-flow fan trailing edge structure on internal flow," Advances in Mechanical Engineering, vol. 10(11) 1-12 (Year: 2018).*

(Continued)

*Primary Examiner* — Steven W Crabb
(74) *Attorney, Agent, or Firm* — Fish & Richardson P.C.

(57) ABSTRACT

Described are computer-related techniques for determining rotation direction of an axial fan for use in fluid flow simulations. The techniques involve receiving by a computer processing system digital data of a three dimensional representation of an axial fan having plural fan blade, determining by the computer processing system from the data of three dimensional representation of the axial fan, at least a single centerline of a single blade of the axial fan from a two dimensional projection of the axial fan, and calculating by the computer processing system based on the initial valve of fan rotation, an actual value of fan rotational direction.

20 Claims, 13 Drawing Sheets

(51) Int. Cl.
  *G06F 30/28* (2020.01)
  *G06F 111/10* (2020.01)
  *G06F 113/08* (2020.01)
  *G06F 119/08* (2020.01)

(52) U.S. Cl.
  CPC ....... *F05B 2210/40* (2013.01); *F05B 2260/84* (2013.01); *G06F 2111/10* (2020.01); *G06F 2113/08* (2020.01); *G06F 2119/08* (2020.01)

(56) References Cited

U.S. PATENT DOCUMENTS

| | | | |
|---|---|---|---|
| 7,794,204 B2* | 9/2010 | Stevens | F04D 29/547 416/189 |
| 2007/0020103 A1* | 1/2007 | Spaggiari | F04D 29/384 416/223 R |
| 2008/0126045 A1 | 5/2008 | Shan et al. | |
| 2015/0044058 A1* | 2/2015 | Hamada | F04D 29/384 416/242 |
| 2020/0285710 A1 | 9/2020 | Chen et al. | |
| 2021/0115802 A1 | 4/2021 | Wang et al. | |

OTHER PUBLICATIONS

Ren et al., "Response surface method-based optimization of the shroud of an axial cooling fan for high performance and low noise," J. Mechanical Sci. Tech., Jan. 2013, 27(1):33-42.

Extended European Search Report in European Appln. No. 20201688.7, dated Feb. 25, 2021, 7 pages.

Heo et al., "Development of high-performance and low-noise axial-flow fan units in their local operating region," Journal of Mechanical Science and Technology 29 (9), Jan. 2015, 3653-3662.

Zhou et al., "Parametric Design and Numerical Simulation of the Axial-Flow Fan for Electronic Devices," IEEE Transactions on Components and Packaging Technologies, vol. 33, No. 2, Jun. 2010, 12 pages.

* cited by examiner

METHOD FOR AUTOMATIC DETECTION OF AXIAL COOLING FAN ROTATION DIRECTION

CLAIM OF PRIORITY

This application claims priority under 35 USC § 119(e) to U.S. Provisional Patent Application Ser. No. 62/916,313, filed on Oct. 17, 2019, and entitled "Method for Automatic Detection of Axial Cooling Fan Rotation Direction," the entire contents of which are hereby incorporated by reference.

BACKGROUND

This description relates to computer simulation of physical processes, such as physical fluid flows.

High Reynolds number flow has been simulated by generating discretized solutions of the Navier-Stokes differential equations by performing high-precision floating point arithmetic operations at each of many discrete spatial locations on variables representing the macroscopic physical quantities (e.g., density, temperature, flow velocity). Another approach replaces the differential equations with what is generally known as lattice gas (or cellular) automata, in which the macroscopic-level simulation provided by solving the Navier-Stokes equations is replaced by a microscopic-level model that performs operations on particles moving between sites on a lattice.

Some fluid simulations involve simulating fluid flow caused by an axial cooling fan that has blades and a motor, which together move surrounding fluid for cooling or ventilation. Determining rotation direction of an axial fan in a numerical fluid simulation can be a non-trivial process. Conventional determination of axial fan rotation direction for a numerical simulation often requires a visual inspection of the fan in a 3D simulation domain by a human with related expertise. Such manual approaches may introduce mistakes especially considering the numerous variations of axial fan designs. The consequences of such mistakes may include performing numerous simulation reruns that can increase costs of simulation performance and result in missing product design deadlines, etc., because such mistakes often can only be discovered after simulations are completed.

SUMMARY

According to an aspect, a computer-implemented method includes receiving by a computer processing system digital data of a three dimensional representation of an axial fan having plural fan blade, determining by the computer processing system from the data of three dimensional representation of the axial fan, at least a single centerline of a single blade of the axial fan from a two dimensional projection of the axial fan, and calculating by the computer processing system based on the initial value of fan rotation, an actual value of fan rotational direction.

The following are some of the features described herein that are among features that are within the scope of the above aspect.

Calculating the actual value of fan rotation direction includes partitioning by the computer processing system received data into a first partition corresponding to a fan blade segment and a second partition corresponding to a motor segment. Calculating the actual value of fan rotation direction includes determining by the computer processing system from the partitioned data, a target blade segment based on a viewing angle, extracting by the computer processing system a centerline from the target blade segment, calculating by the computer processing system slopes of edges of the blade to determine a leading side region or a trailing side region of the centerline, and setting by the computer processing system actual fan rotational direction, according to the calculated slopes.

Determining the fan blade segment includes calculating axial fan diameter to normalize the parameters, generating a ring according to the calculated axial fan diameter, identifying overlapping parts of the axial fan by applying a Boolean function to the ring and the calculated fan diameter, and performing a Boolean operation on the ring and the fan geometry to isolate overlapping parts.

Calculating the actual fan rotation direction includes causing the system to radially project a plurality of rays from the center of the axial fan. Calculating the actual fan rotation direction further includes recording by the system a non-zero signal for each instance where a projected ray intersects a solid surface of the two dimensional representation of the axial fan. Calculating the actual fan rotation direction further includes calculating by the system, centerlines of the blades from the non-zero signals, performing a slope calculation on each blade to determine trailing and leading edges of the blades, and determining fan rotation direction according the determined trailing and leading edges.

The aspect further includes simulating a physical fluid flow process in a flow volume that includes the representation of the axial fan according to the determined fan rotation direction and wherein the actual fan rotational direction is determined by setting the rotation direction as the direction in which the leading side region enters the fluid first or as the rotation direction in which the trailing side region enters the fluid last.

According to an additional aspect, a computer system includes one or more processors and memory operatively coupled to the one or more processors. The system also includes a computer readable storage medium that stores executable computer instructions that cause the computer system to receive digital data of a three dimensional representation of an axial fan having plural fan blade, determine from the data of three dimensional representation of the axial fan, at least a single centerline of a single blade of the axial fan from a two dimensional projection of the axial fan, and calculate based on the initial valve of fan rotation, an actual value of fan rotational direction.

The following are some of the features described herein that are among features that are within the scope of the above aspect.

The computer system wherein instructions to calculate the actual value comprises instructions to partition received data into a first partition corresponding to a fan blade segment and a second partition corresponding to a motor segment. The computer system instructions to calculate the fan rotation direction, further comprises instructions to determine from the partitioned data, a target blade segment based on a viewing angle, extract a centerline from the target blade segment, calculate slopes of edges of the blade to determine a leading side region and a trailing side region of the centerline, and set actual fan rotational direction according to the calculated slopes.

Instructions to determine the centerline of the single blade includes instructions to calculate axial fan diameter to normalize the parameters, generate a ring according to the calculated axial fan diameter, identify overlapping parts of the axial fan by applying a Boolean function to the ring and the calculated fan diameter, and perform a Boolean operation on the ring and the fan geometry to isolate overlapping parts.

Instructions to calculate the fan rotation direction further includes instructions to cause the system to radially project a plurality of rays from the center of the axial fan. Instructions to calculate the fan rotation direction further includes instructions to record a non-zero signal for each instance where a projected ray intersects a solid surface of the two dimensional representation of the axial fan. The instructions to calculate the fan rotation direction further includes instructions to calculate by the system, centerlines of the blades from the non-zero signals, perform a slope calculation on each blade to determine trailing and leading edges of the blades, and determine fan rotation direction according the determined trailing and leading edges.

According to an additional aspect, a computer program product is stored on an non-transitory computer readable medium and includes instructions causing a computer system to receive digital data of a three dimensional representation of an axial fan having plural fan blade, determine from the data of three dimensional representation of the axial fan, at least a single centerline of a single blade of the axial fan from a two dimensional projection of the axial fan, and calculate based on the initial valve of fan rotation, an actual value of fan rotational direction.

The following are some of the features described herein that are among features that are within the scope of the above aspect.

The instructions to calculate the actual value includes instructions to partition received data into a first partition corresponding to a fan blade segment and a second partition corresponding to a motor segment. The instructions to calculate the fan rotation direction, further includes instructions to determine from the partitioned data, a target blade segment based on a viewing angle, by instructions to generate a ring according to the calculated axial fan diameter, identify overlapping parts of the axial fan by applying a Boolean function to the ring and the calculated fan diameter, and perform a Boolean operation on the ring and the fan geometry to isolate overlapping parts, extract a centerline from the target blade segment, calculate slopes of edges of the blade to determine a leading side region and a trailing side region of the centerline, and set actual fan rotational direction according the calculated slopes.

The instructions to determine the centerline of the single blade includes instructions to cause the system to radially project a plurality of rays from the center of the axial fan. The instructions to determine the centerline of the single blade includes instructions to record a non-zero signal for each instance where a projected ray intersects a solid surface of the two dimensional representation of the axial fan.

Still other aspects include methods, computer systems, and computer program products for performing fluid simulations using automatically calculated fan rotation direction process.

The techniques disclosed herein avoid many of the issues that may arise with conventional determinations of axial fan rotation direction. These techniques obviate the need for visual inspections of the axial fan in the 3D simulation domain, and thus may obviate the need for a user to have the expertise required for the known manual techniques.

The disclosed techniques avoid mistakes that may occur with the manual techniques. The disclosed techniques can be used with a considerable plurality of variations of axial fan designs. These disclosed techniques can reduce the number of simulation reruns, and concomitant therewith, can significantly decrease costs of simulation performance and can assist in meeting product design deadlines.

Figure 1:
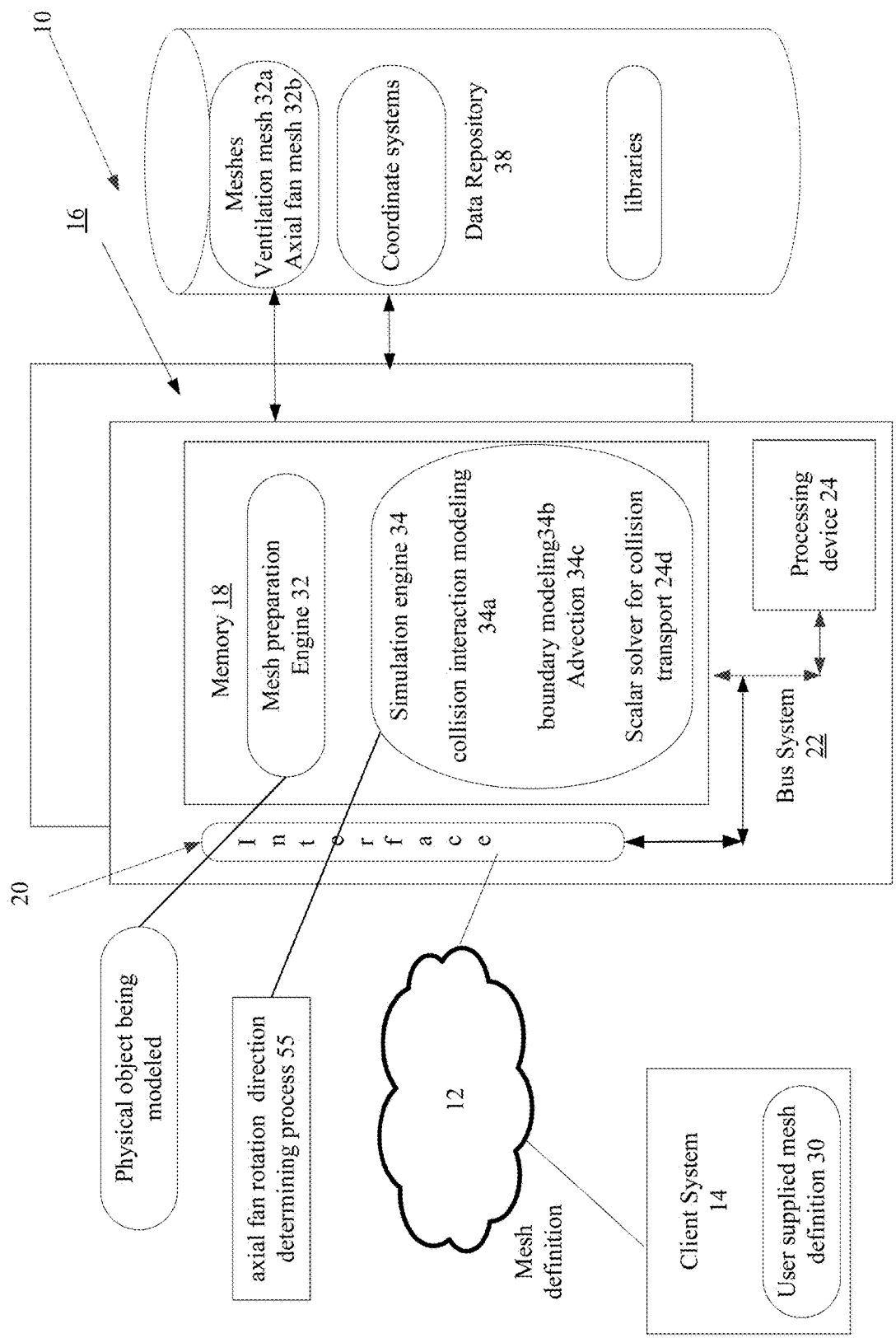
FIG. 1 depicts a system for simulation of fluid flows, which includes a process for determining axial fan rotation direction, with the simulation example using a turbulent boundary layer model for compressible flows.

Below is an example application of the automated process for determining fan rotation direction as applied in a LBM fluid simulation example using a turbulent boundary layer model for compressible flows. However, the use of a LBM fluid simulation and the use of a turbulent boundary layer model are merely illustrative examples of the use of the automated process for determining fan rotation direction. Other simulation techniques such as computation fluid dynamic techniques, e.g., shear stress transport formulation of a k-Omega turbulence model for example could be used.

DETAILED DESCRIPTION

An automated process for determining fan rotation direction can be used for a fluid flow simulation performed by the simulation engine 34. For example, as described in U.S. patent application Ser. No. 11/463,673, entitled COMPUTER SIMULATION OF PHYSICAL PROCESS (now issued as U.S. Pat. No. 7,558,714) incorporated herein in its entirety by reference.

In the procedure discussed in FIG. 9 below, a flow simulation process is described using the automated process for determining fan rotation direction to configure a simulation space. In the figures that follow such as FIGS. 10-14, each of these figures are labeled as prior art because these figures appear in the above referenced patent. However, those figures as they appear in the above patent do not take into consideration any modifications that would be made to a flow simulation using the automated process for determining fan rotation direction discussed herein in order to configure a simulation space, because the automated process as described herein is not described in the above referenced patent.

In a LBM-based physical process simulation system, fluid flow is represented by the distribution function values $f_i$, evaluated at a set of discrete velocities $c_i$. The dynamics of the distribution function is governed by the equation below, where $f_i(0)$ is known as the equilibrium distribution function, defined as:

$$f_\alpha^{(0)} = w_\alpha \rho \left[ 1 + u_\alpha + \frac{u_\alpha^2 - u^2}{2} + \frac{u_\alpha(u_\alpha^2 - 3u^2)}{6} \right] \qquad \text{Eq. (I-1)}$$

This equation is the well-known lattice Boltzmann equation that describe the time-evolution of the distribution function, $f_i$. The left-hand side represents the change of the distribution due to the so-called "streaming process." The streaming process is when a pocket of fluid starts out at a grid location, and then moves along one of the velocity vectors to the next grid location. At that point, the "collision factor," i.e., the effect of nearby pockets of fluid on the starting pocket of fluid, is calculated. The fluid can only move to another grid location, so the proper choice of the velocity vectors is necessary so that all the components of all velocities are multiples of a common speed.

The right-hand side of the first equation is the aforementioned "collision operator" which represents the change of the distribution function due to the collisions among the pockets of fluids. The particular form of the collision operator used here is due to Bhatnagar, Gross and Krook (BGK). It forces the distribution function to go to the prescribed values given by the second equation, which is the "equilibrium" form.

From this simulation, conventional fluid variables, such as mass $\rho$ and fluid velocity u, are obtained as simple summations. Here, the collective values of $c_i$ and $w_i$, define a LBM model. The LBM model can be implemented efficiently on scalable computer platforms and run with great robustness for time unsteady flows and complex boundary conditions.

A standard technique of obtaining the macroscopic equation of motion for a fluid system from the Boltzmann equation is the Chapman-Enskog method in which successive approximations of the full Boltzmann equation are taken.

In a fluid system, a small disturbance of the density travels at the speed of sound. In a gas system, the speed of the sound is generally determined by the temperature. The importance of the effect of compressibility in a flow is measured by the ratio of the characteristic velocity and the sound speed, which is known as the Mach number.

Referring now to FIG. 1, a system 10 that includes a turbulent boundary layer model that incorporates pressure gradient directional effect 34b for high speed and compressible flows is described. The system 10 in this implementation is based on a client-server or cloud based architecture and includes a server system 12 implemented as a massively parallel computing system 12 (stand alone or cloud-based) and a client system 14. The server system 12 includes memory 18, a bus system 11, interfaces 20 (e.g., user interfaces/network interfaces/display or monitor interfaces, etc.) and a processing device 24. In memory 18 are a mesh preparation engine 32 and a simulation engine 34.

While FIG. 1 shows the mesh preparation engine 32 in memory 18, the mesh preparation engine can be a third party application that is executed on a different system than server 12. Whether the mesh preparation engine 32 executes in memory 18 or is executed on a different system than server 12, the mesh preparation engine 32 receives a user-supplied mesh definition 30 and the mesh preparation engine 32 prepares a mesh and sends (and or stores) the prepared mesh to the simulation engine 34 according to a physical object that is being modelled for simulation by the simulation engine 34. The simulation engine 34 includes collision interaction module 34a, boundary module 34b and advection particle collision interaction module 34c.

In the example discussed herein the physical object is an ventilation system that includes an axial fan. The use of a ventilation system is merely illustrative however, as the physical object that includes the axial fan can be of any shape, and in particular can have planar and/or curved surface(s). In addition, in some implementations fluid flow can be in a fluid environment in which the axial fan is positioned. The system 10 accesses a data repository 38 that stores 2D and/or 3D meshes (Cartesian and/or curvilinear), e.g., 32a for the ventilation system and 32b for the axial fan, coordinate systems, and libraries.

Also included is an automated process 55 for determining axial fan rotation direction. This process can be part of the mesh preparation process, a separate process or included in the simulation process. A thorough discussion of this process 55 is set out in FIGS. 15A-15F. As with the mesh preparation engine 32, the automated process 55 for determining axial fan rotation direction (direction determination process 55) could execute in memory 18 or could be executed on a different system than server 12, and the server receives (and/or stores) the results of the direction determination process 55 use by the simulation engine 34 (or can be used for other applications in which fan rotation direction is needed to be determined). Use with the simulation engine 34 is merely an example use.

Figure 2:
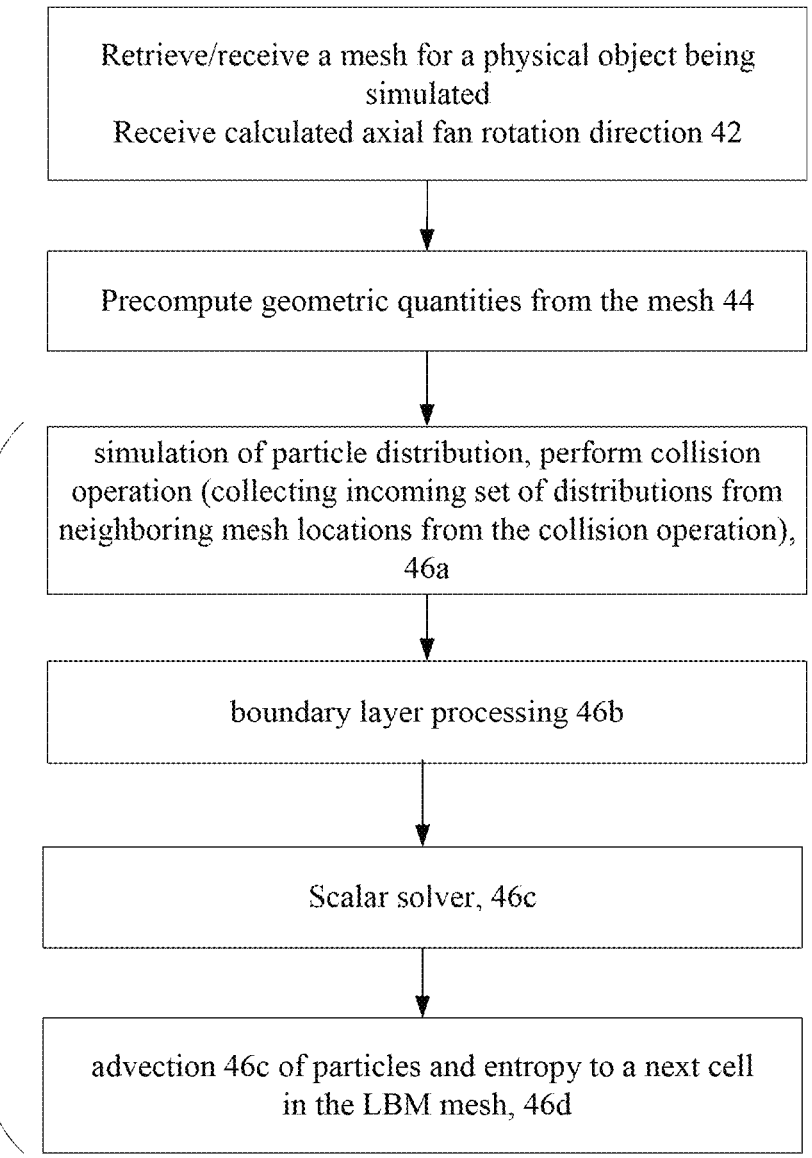
FIG. 2 depicts a flow chart showing operations for formulation of a Lattice Boltzmann Model simulation with the determined fan direction and the turbulent boundary layer model.

Referring now to FIG. 2, a process 40 for simulating fluid flow about the mesh representation 32b of the axial fan and the ventilation mesh 32a representation as physical objects is shown. The process 40 receives 42, e.g., from client system 14 or retrieves from the data repository 38, a mesh 32a (or grid) for the physical object being simulated, the ventilation system. In other embodiments, either an external system or the server 12 based on user input, generates the mesh 32a for the physical object being simulated. The process 40 also receives 42, e.g., from client system 14 or retrieves from the data repository 38, a three dimensional representation for the axial fan, and determines 41 axial fan rotation direction by either invoking the direction determination process 55 for determining axial fan rotation direction or being supplied the calculated axial fan rotation direction from another system/process that executed the automated process 55. That is, in some embodiments, either an external system or the server 12 executes the direction determination process 55 for determining axial fan rotation direction and provides that determined direction as input to the simulation process 40.

The simulation process 46 simulates evolution of particle distribution according to a lattice Boltzmann equation (LBE). The process precomputes 44 geometric quantities from the retrieved mesh and performs a dynamic Lattice Boltzmann Model simulation 46 using the precomputed geometric quantities corresponding to the retrieved mesh. The process 46 performs a collision operation 46a (and collects an incoming set of distributions from neighboring mesh locations from the collision operation), evaluates 46b flows at physical boundaries according to boundary modeling, when the flow impacts a physical surface, may perform scalar processing by applying a scalar solver 46c, and performs an advection 46d of particles to next cells in the LBM mesh.

Boundary Modeling

Figure 3:
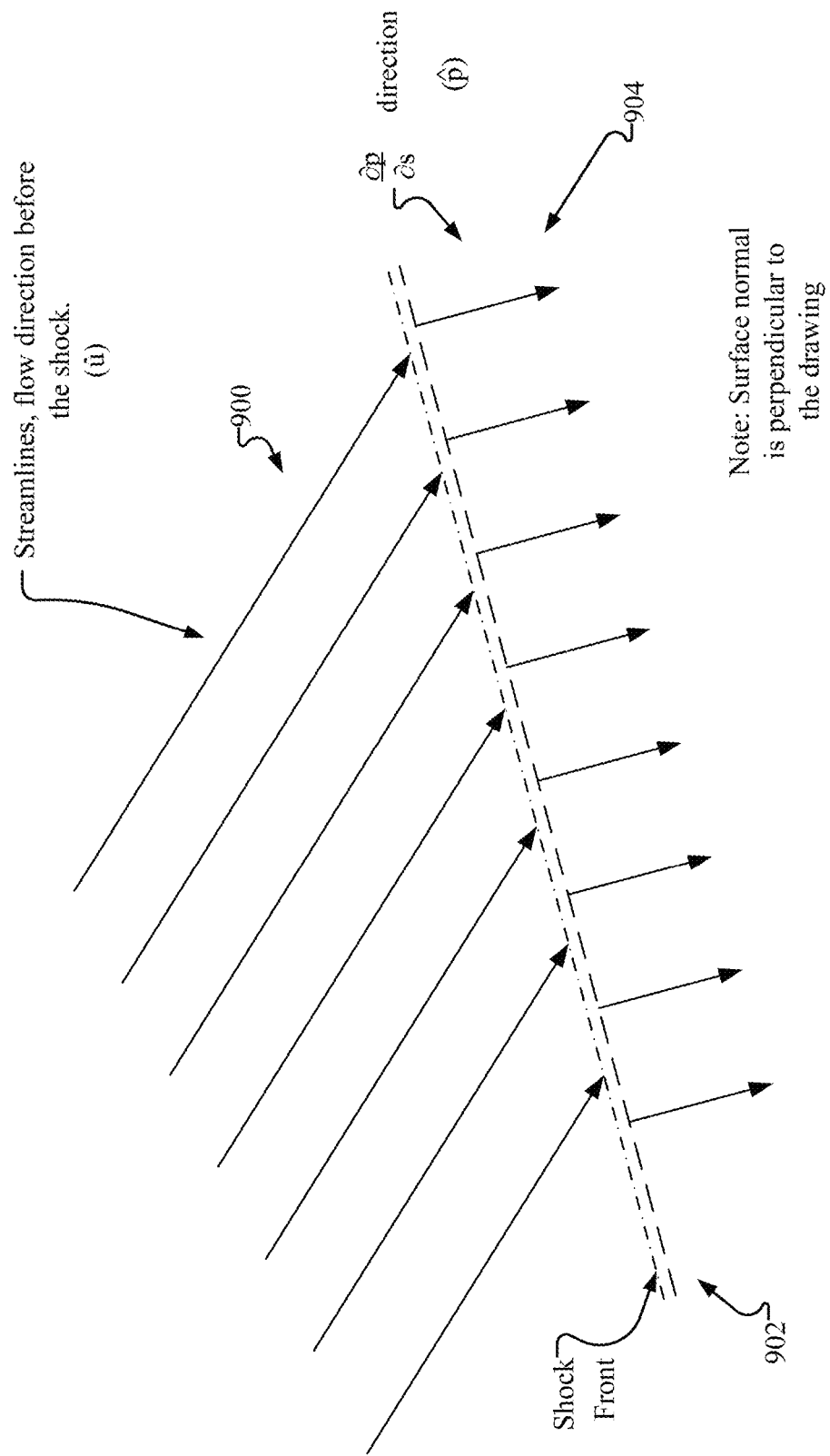
FIG. 3 illustrates the change in direction of a flow when experiencing a shock front (prior art).

Referring now to FIG. 3, change in direction of a flow when experiencing a shock front is illustrated. To correctly simulate interactions with a surface, each facet meets four boundary conditions. First, the combined mass of particles received by a facet should be equal to the combined mass of particles transferred by the facet (i.e., the net mass flux to the facet must equal zero). Second, the combined energy of particles received by a facet should be equal to the combined energy of particles transferred by the facet (i.e., the net energy flux to the facet equals zero). These two conditions may be satisfied by requiring the net mass flux at each energy level (i.e., energy levels one and two) to equal zero.

A boundary layer model can model the wall shear stress (friction) corresponding to the usual no-slip boundary condition that governs the momentum flux occurring at a solid wall, as, $$u_*^2 = v_0 \frac{\partial u}{\partial y}|_{y=0} \qquad \text{Eq. (I-2)}$$

where the gradient value is taken at the wall (y=0), u* is the so-called friction velocity (=square-root of the wall shear stress $\sqrt{\tau_w/\rho}$, and ρ—fluid mass density), and $v_0$ is the molecular kinematic viscosity of the flow. Accurate calculation of this gradient requires resolving the velocity field into very tiny scales up to the wall, which is impractical. A central task in turbulence modeling is to approximate the wall shear stress without directly computing velocity gradient at the wall. This is known as turbulent boundary layer modeling (or wall modeling) in the field of turbulence and computational fluid dynamics.

The formulation of a turbulent boundary layer model resides on the foundation of a fundamental phenomenon of turbulence known as the "law of the wall." That is, if a solid wall is sufficiently flat and a turbulent flow is fully attached along it, over a wide range of locations measured in terms of distance from the wall, the time-averaged velocity profile of a turbulent flow has a known specific, i.e., "universal" form.

This "universal" form is preserved under a scale transformation by certain local intrinsic physics properties such as wall shear stress. Thus, the following expression can be used for the velocity profile $$U(y)/u_* = \frac{1}{\kappa}\log(y^+) + B \qquad \text{(Eq. 1)}$$

where U(y) is the averaged fluid velocity value along the solid wall measured at distance y from the wall and B is a constant (empirically found to have a value of about 5). The quantity $y^+$ is a dimensionless distance from the wall defined as:

$$y^+ = \frac{yu_*}{v_0}$$

The constant κ is the so-called von Karman constant (empirically found to have a value of about 0.41). The logarithmic function form is valid for a wide range of $y^+$ values roughly from 50 to a few hundred or higher. The basic wall model functional form (Eq. 1) can be expanded to cover a wider range of $y^+$ values that include the viscous and transitional sub-layers, 0<<50. The expanded form is given below, $$U(y) = u_*F(y^+) \qquad \text{(Eq. 2)}$$

It is generally accepted that: $F(y^+) = y^+$ for $0 < y^+ \leq 5$;

$$F(y^+) = \frac{1}{\kappa}\log(y^+) + B,$$

for $y^+ \geq 50$; and a transitional profile form is used for $5 < y^+ < 50$.

This "law of the wall," however, is generally only applicable when a boundary layer flow is fully attached along a perfectly flat solid wall, such that velocity variation parallel to the wall is negligible compared to that normal to the wall, which is known as the equilibrium condition. Equation (Eq. 1) defines a relation between the velocity profile (velocity as a function of distance from the wall) and the surface skin-friction. This provides a basis for determining skin-friction without the need of the (unresolvable) velocity gradient information at the wall, which is an observation pertaining to the physics of turbulent boundary layer modeling. The wall shear stress vector defines an effective force by the solid surface acting on the fluid in the direction opposite to the flow velocity direction $$\tau_n = -\rho u_*^2 \hat{u} \qquad \text{(Eq. 3)}$$

where here û is the unit vector in the direction of the flow velocity 900.

However, a solid wall (shock front 902) is often not flat. Therefore, it is desirable to extend the "law of the wall" to non-equilibrium situations where there is flow variation in the stream-wise direction caused by, for example, wall curvature. It is known that the leading order effect of curvature to a turbulent boundary layer profile is the presence of a pressure gradient. Various extensions of the basic wall model have been made, which are generally modifications of equation (Eq. 1) to include terms proportional to pressure gradient.

One such extension is described in U.S. Pat. No. 5,910,902A, incorporated herein in by reference in its entirety, which patent describes an advanced extension of the basic wall model (Eq. 1) using a specific way to include the pressure gradient effect based on an argument of self-similarity of the boundary layer profile under the influence of a pressure gradient. A generic form of this extension is written as:

$$U(y) = u_*F\left(y^+ / \xi\left(\frac{dp}{ds}\right)\right) \qquad \text{(Eq. 4)}$$

where ξ(x) is a dimensionless positive function of x. dp/ds denotes the stream-wise (parallel to local fluid velocity) pressure gradient component, $$\frac{dp}{ds} = \nabla p \cdot \hat{s}$$

where ŝ is the unit vector in the stream-wise direction. This approach enables the accurately simulation of flows around objects of arbitrary shape, including accurate prediction of boundary layer flow separations.

Existing turbulent boundary layer modeling (including that described in the above U.S. Pat. No. 5,910,902A) assumes that the pressure gradient direction is parallel to the velocity direction in the boundary layer. That is, the extensions to equation (2), such as equation (4), only take into account the stream-wise pressure gradient component contribution, while ignoring the perpendicular pressure component. While this is reasonable for addressing the effect of geometric curvature in the direction of flow, yet it happens that flow along a solid surface is not always in the same direction as the curvature direction. For example, consider a cylinder with its main axis forming an angle (0<θ<90) with respect to the direction of flow. As, a consequence of this geometry, the resulting pressure gradient is neither parallel nor perpendicular to the flow direction. Therefore, a generalization to existing turbulent boundary layer modeling is needed to properly capture the effect of curvature on non-parallel boundary layer flow.

Figure 4:
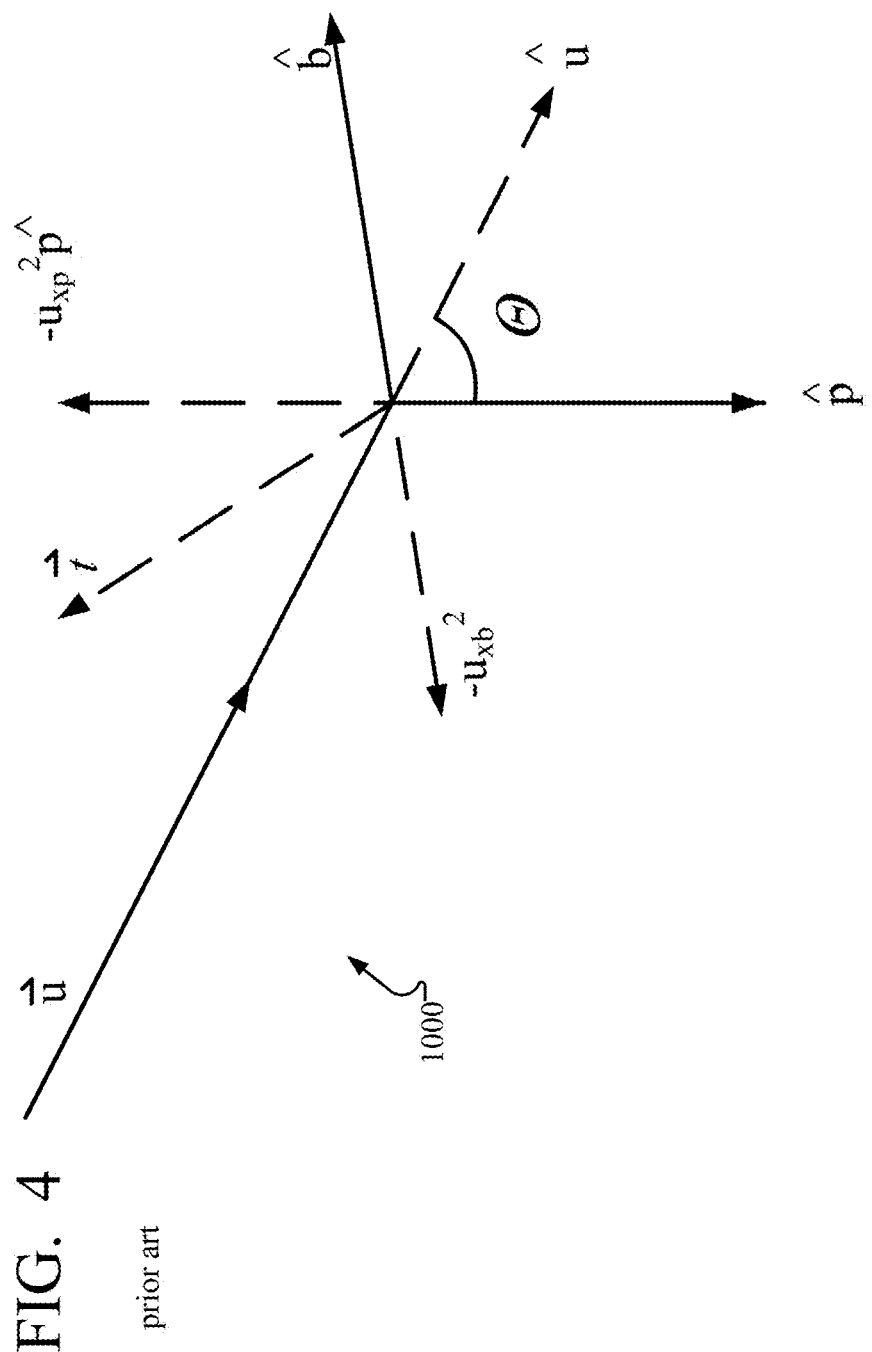
FIG. 4 illustrates a pressure gradient decomposed into components along three orthogonal directions (prior art).

Referring to FIG. 4, as implied above, the pressure gradient can be decomposed into components along three orthogonal directions 70, a direction normal to the wall, and two directions both tangential to the wall, but with one direction the "stream-wise" direction being parallel to the averaged velocity in the boundary layer and the other direction the "span-wise" direction being perpendicular to the wall. Generally, conventional extended wall models the stream-wise pressure gradient component contribution is included, while the span-wise component is ignored or not recognized.

The turbulent boundary layer modeling described herein starts with a different way to deal with the relationship between the pressure gradient direction and the flow velocity direction. Instead of decomposing pressure gradient into the above mentioned three directions (normal to the wall, and two tangential directions, i.e., "stream-wise" and "span-wise"), the process decomposes the boundary layer flow velocity into three directions.

Since the velocity is tangential to the wall, the velocity component normal to the wall is zero, so there are in effect only two velocity directions, i.e., a first direction parallel to the wall-tangent part of the pressure gradient and a second direction perpendicular to the wall-tangent part of the pressure gradient.

Therefore, the velocity vector U can be expressed as:

$$U = U_p \hat{p} + U_b \hat{b} \quad \text{(Eq. 5)}$$

where $\hat{p}$ 904 and $\hat{b}$ are the wall-tangent unit vectors that are parallel to and perpendicular to the wall-tangent part of the pressure gradient direction, respectively. The velocity components are expressed by:

$$U_p = U \cdot \hat{p} \quad \text{(Eq. 6a)}$$

$$U_b = U \cdot \hat{b} \quad \text{(Eq. 6b)}$$

Having decomposed the boundary layer velocity into these two components, it is straightforward to apply appropriate wall modeling based on their two different directions. For the velocity component perpendicular to the pressure gradient, the basic law of the wall model is adopted as in (Eq. 2), namely:

$$U_b(y) = u_{*b} F(y^+) \quad \text{(Eq. 7a)}$$

where the friction velocity $u_{*b}$ corresponds to the skin-friction perpendicular to the pressure gradient direction. In contrast, the extended wall model form (equation (4)) is used for the velocity component parallel to the pressure gradient:

$$U_p(y) = u_{*p} F\left(y^+ \Big/ \xi\left(\frac{dp}{ds}\right)\right) \quad \text{(Eq. 7b)}$$

Therefore, the pressure gradient effect is only applied to the parallel component of the boundary layer velocity. In the above, $u_{*p}$ corresponds to the skin-friction parallel to the pressure gradient direction.

In addition, a more careful definition of the stream-wise pressure gradient dp/ds 904 is provided compared to that which has previously been defined and understood. As discussed above, in conventional understanding, dp/ds is the pressure gradient component in the stream-wise direction, that is, the projection of the pressure gradient in the direction of the boundary layer velocity:

$$\frac{dp}{ds} = \nabla p \cdot \hat{u} \quad \text{(Eq. 8)}$$

In contrast with conventional understanding, dp/ds is defined herein as the component of the pressure gradient tangential to the solid surface, which in general is not the same as the velocity direction. Explicitly, dp/ds according to this interpretation is defined as:

$$\frac{dp}{ds}\hat{t} = \nabla p - \hat{n}\hat{n} \cdot \nabla p$$

where $\hat{n}$ is the unit vector normal to the solid surface, and the unit vector t is in the direction of projected pressure gradient tangential to the surface (equivalent to the unit vector $\hat{p}$ defined in {Eq. 5).

The absolute value of the new dp/ds is, in general, greater than that of the conventional definition, because $$\frac{dp}{ds}(\text{old}) = \hat{u} \cdot \hat{t} \frac{dp}{ds}(\text{new}).$$

Consequently, the resulting pressure gradient effect is slightly stronger in the new extended wall model. Most importantly, since in general the boundary layer velocity is not parallel to the (tangential part of) the pressure gradient, the resulting skin friction force is no longer parallel to the velocity direction.

Combining all the above, results in a new representation of wall shear stress given as:

$$\tau_n = -\rho(u_{*p}^2 \hat{p} + u_{*b}^2 \hat{b}) \quad \text{(Eq. 9)}$$

It is seen that since $u_{*p}$ is in general not equal to $u_{*b}$, the wall shear stress direction is not parallel to the flow velocity direction. This feature is believed to be lacking in all previous turbulent boundary layer models. It is expected therefore that the described extended wall model will show a substantial improvement for solid wall surfaces that are not flat, therefore, extending the "law of the wall" to non-equilibrium situations where there is flow variation in the stream-wise direction caused by, for example, wall curvature, over conventional wall models. The non-parallel skin friction force effect of the disclosed wall model may provide more accurate predictions of a boundary layer turning phenomena due to presence of a near-wall shock on a curved surface.

Figure 5:
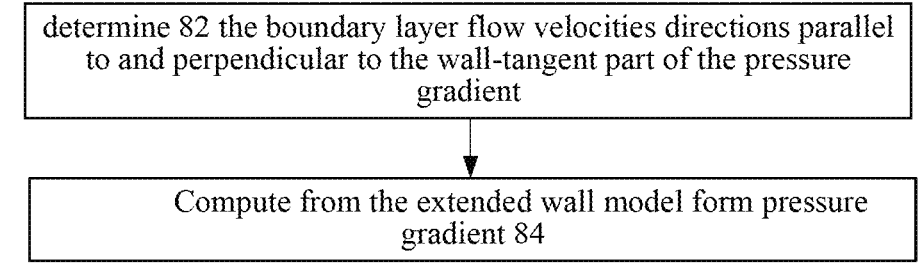
FIG. 5 depicts a flow chart showing aspects of the turbulent boundary layer model (prior art).

Referring to FIG. 5, a turbulent boundary layer model is evaluated. The turbulent boundary layer model determine 82 the boundary layer flow velocities. While there are three directions, the velocity component normal to the wall is considered as zero, so in effect only two velocity directions are determined, i.e., a first direction parallel to the wall-tangent part of the pressure gradient and a second direction perpendicular to the wall-tangent part of the pressure gradient see Eq. 6a and Eq. 6b (above).

Using the two components of the boundary layer velocity Eq. 6a and Eq. 6b (above), the turbulent boundary layer model computes pressure gradients 84 based on these velocity components, by applying in the extended wall model form the velocity component parallel to the pressure gradient given above in Eq. 9, as wall shear stress in which the wall shear stress direction is not parallel to the flow velocity direction.

Figure 6:
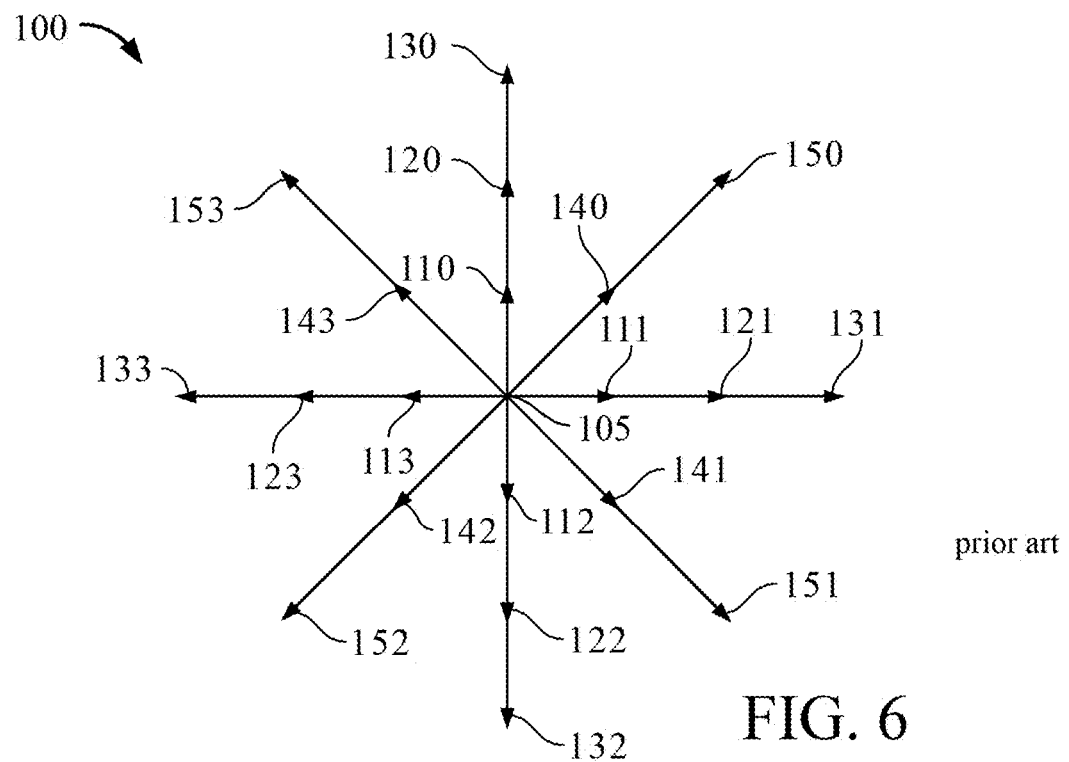
FIGS. 6 and 7 illustrate velocity components of two LBM models (prior art).

Referring to FIG. 6, a first model (2D-1) 100 is a two-dimensional model that includes 21 velocities. Of these 21 velocities, one (105) represents particles that are not moving; three sets of four velocities represent particles that are moving at either a normalized speed (r) (110-113), twice the normalized speed (2r) (120-123), or three times the normalized speed (3r) (130-133) in either the positive or negative direction along either the x or y axis of the lattice; and two sets of four velocities represent particles that are moving at the normalized speed (r) (140-143) or twice the normalized speed (2r) (150-153) relative to both of the x and y lattice axes.

Figure 7:
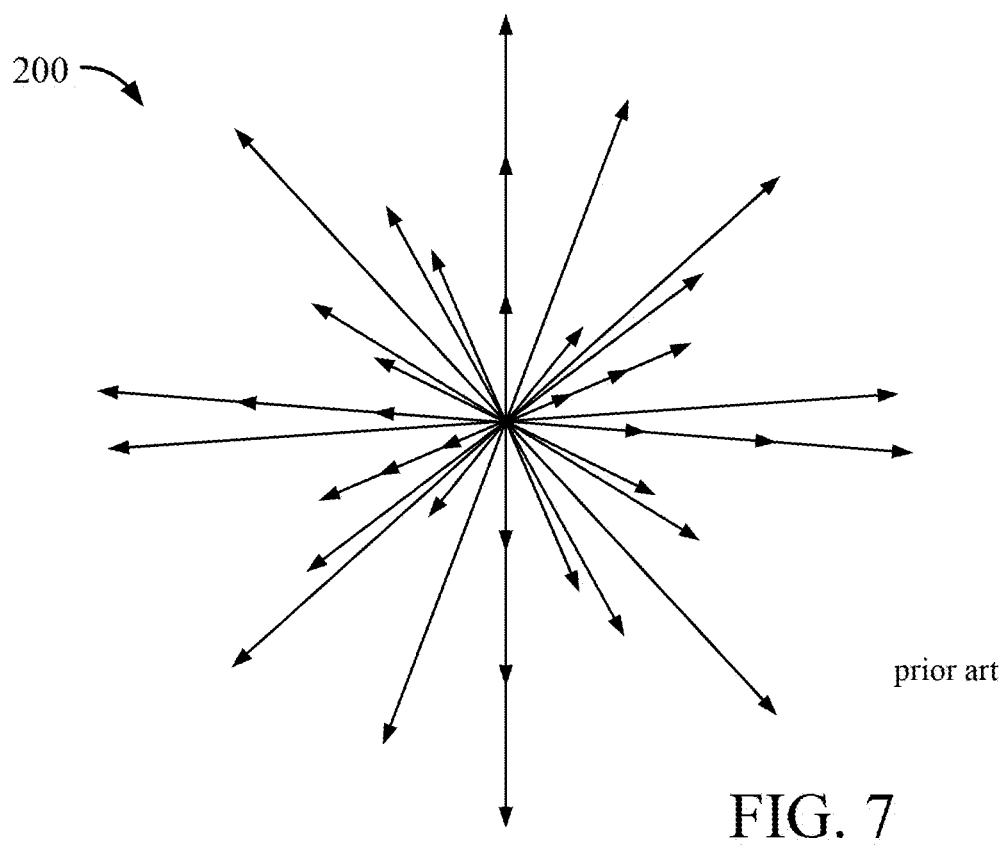

As also illustrated in FIG. 7, a second model (3D-1) 200 is a three-dimensional model that includes 39 velocities, where each velocity is represented by one of the arrowheads of FIG. 7. Of these 39 velocities, one represents particles that are not moving; three sets of six velocities represent particles that are moving at either a normalized speed (r), twice the normalized speed (2r), or three times the normalized speed (3r) in either the positive or negative direction along the x, y or z axis of the lattice; eight represent particles that are moving at the normalized speed (r) relative to all three of the x, y, z lattice axes; and twelve represent particles that are moving at twice the normalized speed (2r) relative to two of the x, y, z lattice axes.

More complex models, such as a 3D-2 model includes 101 velocities and a 2D-2 model includes 37 velocities also may be used. The velocities are more clearly described by their component along each axis as documented in Tables 1 and 2 respectively.

For the three-dimensional model 3D-2, of the 101 velocities, one represents particles that are not moving (Group 1); three sets of six velocities represent particles that are moving at either a normalized speed (r), twice the normalized speed (2r), or three times the normalized speed (3r) in either the positive or negative direction along the x, y or z axis of the lattice (Groups 2, 4, and 7); three sets of eight represent particles that are moving at the normalized speed (r), twice the normalized speed (2r), or three times the normalized speed (3r) relative to all three of the x, y, z lattice axes (Groups 3, 8, and 10); twelve represent particles that are moving at twice the normalized speed (2r) relative to two of the x, y, z lattice axes (Group 6); twenty four represent particles that are moving at the normalized speed (r) and twice the normalized speed (2r) relative to two of the x, y, z lattice axes, and not moving relative to the remaining axis (Group 5); and twenty four represent particles that are moving at the normalized speed (r) relative to two of the x, y, z lattice axes and three times the normalized speed (3r) relative to the remaining axis (Group 9).

For the two-dimensional model 2D-2, of the 37 velocities, one represents particles that are not moving (Group 1); three sets of four velocities represent particles that are moving at either a normalized speed (r), twice the normalized speed (2r), or three times the normalized speed (3r) in either the positive or negative direction along either the x or y axis of the lattice (Groups 2, 4, and 7); two sets of four velocities represent particles that are moving at the normalized speed (r) or twice the normalized speed (2r) relative to both of the x and y lattice axes; eight velocities represent particles that are moving at the normalized speed (r) relative to one of the x and y lattice axes and twice the normalized speed (2r) relative to the other axis; and eight velocities represent particles that are moving at the normalized speed (r) relative to one of the x and y lattice axes and three times the normalized speed (3r) relative to the other axis.

The LBM models described above provide a specific class of efficient and robust discrete velocity kinetic models for numerical simulations of flows in both two- and three-dimensions. A model of this kind includes a particular set of discrete velocities and weights associated with those velocities. The velocities coincide with grid points of Cartesian coordinates in velocity space which facilitates accurate and efficient implementation of discrete velocity models, particularly the kind known as the lattice Boltzmann models. Using such models, flows can be simulated with high fidelity.

Figure 8:
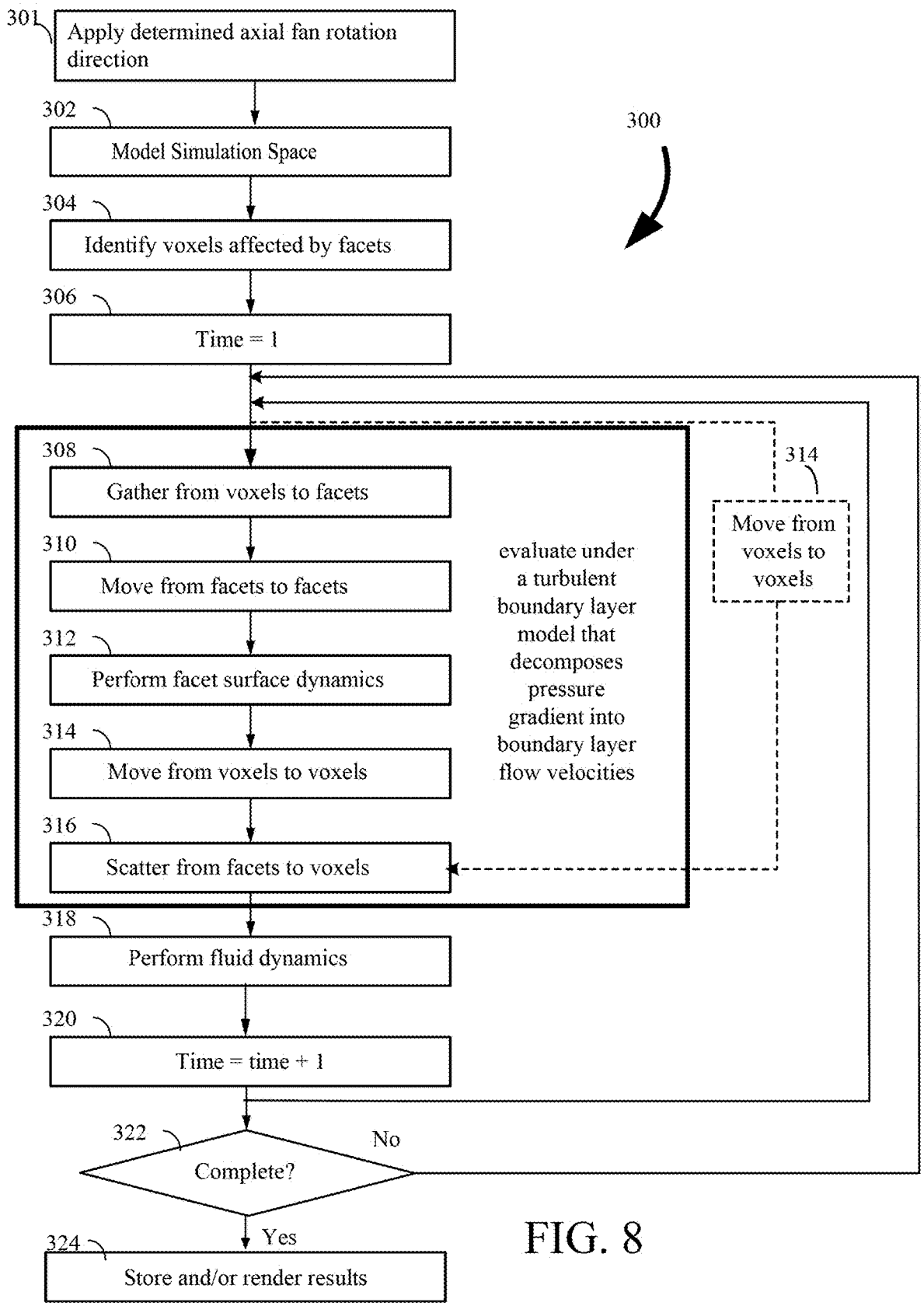
FIG. 8 is a flow chart of an axial fan rotation direction procedure followed by a physical process simulation system.

Referring to FIG. 8, a physical process simulation system operates according to a procedure 300 to simulate a physical process such as fluid flow in which an axial fan is disposed. Prior to the simulation, a determined axial fan rotation direction is received from execution of a process that automatically calculates the axial cooling fan rotation direction (as in FIGS. 14 and 15A-15F) and applied 301 to a fluid simulation. As part of the fluid simulation, a simulation space is modeled as a collection of voxels (step 302). Typically, the simulation space is generated using a computer-aided-design (CAD) program. For example, a CAD program could be used to draw an axial fan positioned in a ventilation system.

Thereafter, data produced by the CAD program is processed to add a lattice structure having appropriate resolution and to account for objects and surfaces within the simulation space.

The resolution of the lattice may be selected based on the Reynolds number of the system being simulated. The Reynolds number is related to the viscosity (v) of the flow, the characteristic length (L) of an object in the flow, and the characteristic velocity (u) of the flow:

$$Re = uL/v. \qquad \text{Eq.(I-3)}$$

The characteristic length of an object represents large scale features of the object. For example, if flow around a micro-device were being simulated, the height of the micro-device might be considered to be the characteristic length. For a flow about an axial fan the diameter of the fan might be considered as the characteristic length. When flow around small regions of an object (e.g., a gap region between the fan and the shroud) is of interest, the resolution of the simulation may be increased, or areas of increased resolution may be employed around the regions of interest. The dimensions of the voxels decrease as the resolution of the lattice increases.

The state space is represented as $f_i(x, t)$, where $f_i$ represents the number of elements, or particles, per unit volume in state i (i.e., the density of particles in state i) at a lattice site denoted by the three-dimensional vector x at a time t. For a known time increment, the number of particles is referred to simply as $f_i(x)$. The combination of all states of a lattice site is denoted as $f(x)$.

The number of states is determined by the number of possible velocity vectors within each energy level. The velocity vectors consist of integer linear speeds in a space having three dimensions: x, y, and z. The number of states is increased for multiple-species simulations.

Each state i represents a different velocity vector at a specific energy level (i.e., energy level zero, one or two). The velocity $c_i$ of each state is indicated with its "speed" in each of the three dimensions as follows:

$$c_i = (c_{i,x}, c_{i,y}, c_{i,z}).\qquad\text{Eq.(I-4)}$$

The energy level zero state represents stopped particles that are not moving in any dimension, i.e. $c_{stopped} = (0, 0, 0)$. Energy level one states represent particles having a ±1 speed in one of the three dimensions and a zero speed in the other two dimensions. Energy level two states represent particles having either a ±1 speed in all three dimensions, or a ±2 speed in one of the three dimensions and a zero speed in the other two dimensions.

Generating all of the possible permutations of the three energy levels gives a total of 39 possible states (one energy zero state, 6 energy one states, 8 energy three states, 6 energy four states, 12 energy eight states and 6 energy nine states.).

Each voxel (i.e., each lattice site) is represented by a state vector f(x). The state vector completely defines the status of the voxel and includes 39 entries. The 39 entries correspond to the one energy zero state, 6 energy one states, 8 energy three states, 6 energy four states, 12 energy eight states and 6 energy nine states. By using this velocity set, the system can produce Maxwell-Boltzmann statistics for an achieved equilibrium state vector.

During simulation when the process encounters in the mesh a location corresponding to a surface of a physical object or the device the process performs the above functions by evaluating under the turbulent boundary layer model that decomposes pressure gradient into boundary layer flow velocities, as discussed above.

Figure 9:
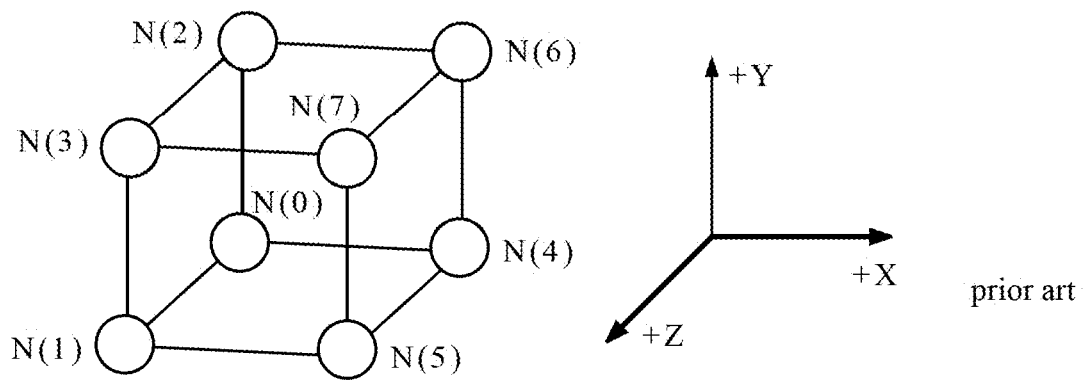
FIG. 9 is a perspective view of a microblock (prior art).

Referring now to FIG. 9, a microblock is illustrated. For processing efficiency, the voxels are grouped in 2×2×2 volumes called microblocks. The microblocks are organized to permit parallel processing of the voxels and to minimize the overhead associated with the data structure. A short-hand notation for the voxels in the microblock is defined as $N_i(n)$, where n represents the relative position of the lattice site within the microblock and $n \in \{0, 1, 2, \ldots, 7\}$.

Figure 10A:
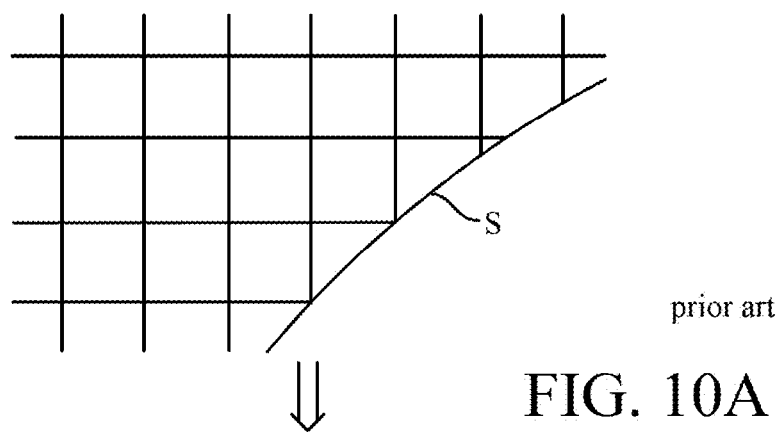
FIGS. 10A and 10B are illustrations of lattice structures (prior art).
Figure 10B:
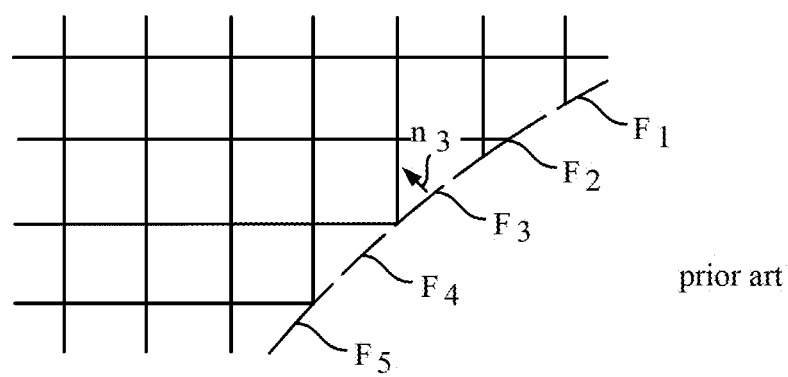

Referring to FIGS. 10A and 10B, a surface S (FIG. 10A) is represented in the simulation space (FIG. 10B) as a collection of facets $F_\alpha$:

$$S = \{F_\alpha\}\qquad\text{Eq.(I-5)}$$

where $\alpha$ is an index that enumerates a particular facet. A facet is not restricted to the voxel boundaries, but is typically sized on the order of or slightly smaller than the size of the voxels adjacent to the facet so that the facet affects a relatively small number of voxels. Properties are assigned to the facets for the purpose of implementing surface dynamics. In particular, each facet $F_\alpha$ has a unit normal ($n_\alpha$), a surface area ($A_\alpha$), a center location ($x_\alpha$), and a facet distribution function ($f_i(\alpha)$) that describes the surface dynamic properties of the facet.

Figure 11:
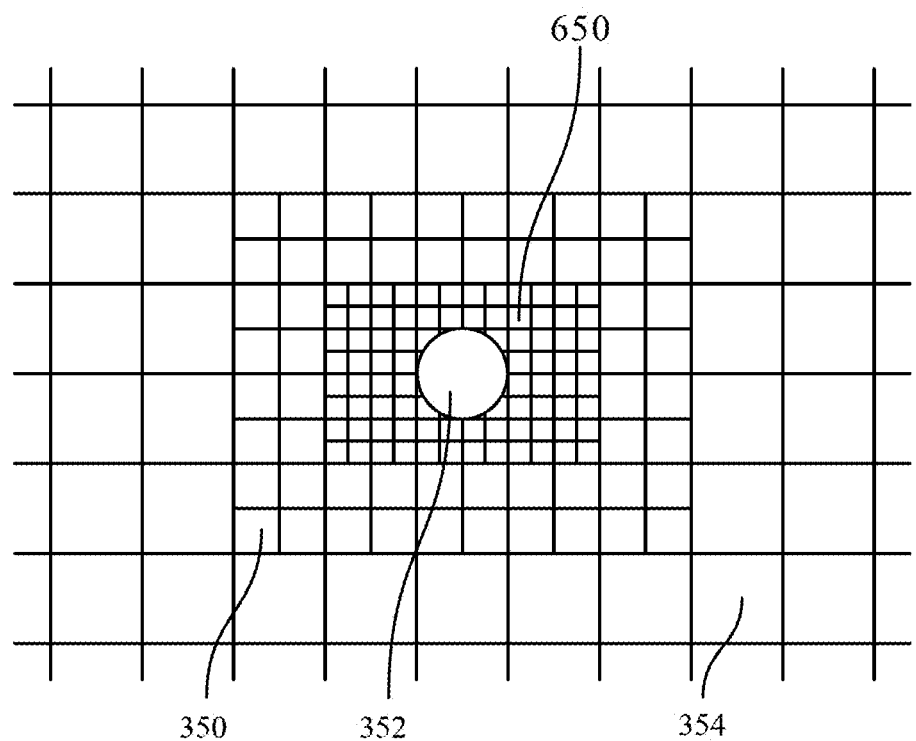
FIGS. 11 and 12 illustrate variable resolution techniques (prior art).

Referring to FIG. 11, different levels of resolution may be used in different regions of the simulation space to improve processing efficiency. Typically, the region 650 around an object 655 is of the most interest and is therefore simulated with the highest resolution. Because the effect of viscosity decreases with distance from the object, decreasing levels of resolution (i.e., expanded voxel volumes) are employed to simulate regions 350, 354 that are spaced at increasing distances from the object 352.

Figure 12:
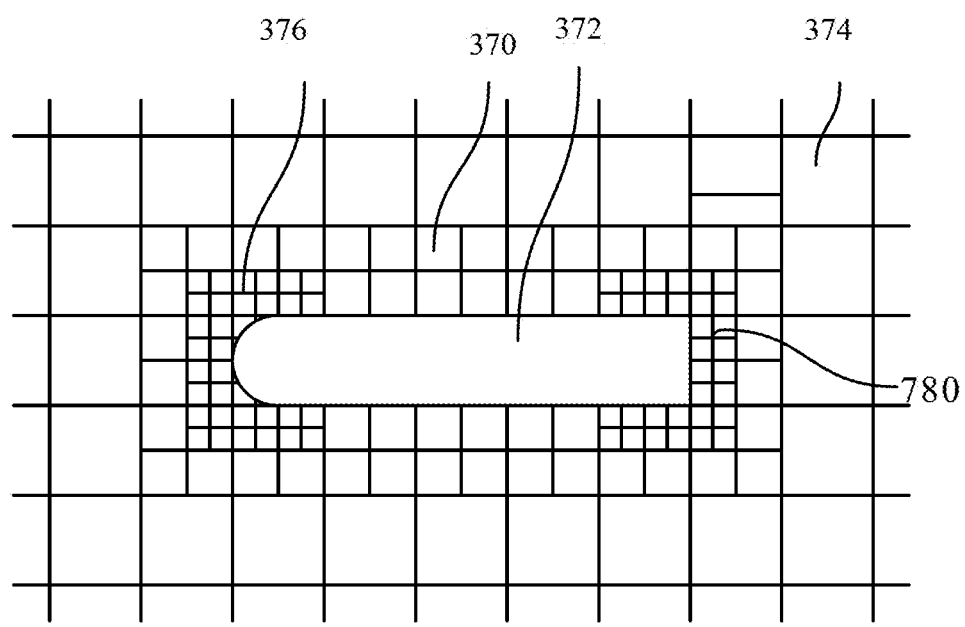

Similarly, as illustrated in FIG. 12, a lower level of resolution may be used to simulate a region 370 around less significant features of an object 372 while the highest level of resolution is used to simulate regions 374 around the most significant features (e.g., the leading and trailing surfaces) of the object 372. Outlying regions 376 are simulated using the lowest level of resolution and the largest voxels.

Identify Voxels Affected By Facets

Referring again to FIG. 9, once the simulation space has been modeled (step 302), voxels affected by one or more facets are identified (step 304). Voxels may be affected by facets in a number of ways. First, a voxel that is intersected by one or more facets is affected in that the voxel has a reduced volume relative to non-intersected voxels. This occurs because a facet, and material underlying the surface represented by the facet, occupies a portion of the voxel. A fractional factor $P_f(x)$ indicates the portion of the voxel that is unaffected by the facet (i.e., the portion that can be occupied by a fluid or other materials for which flow is being simulated). For non-intersected voxels, $P_f(x)$ equals one.

Voxels that interact with one or more facets by transferring particles to the facet or receiving particles from the facet are also identified as voxels affected by the facets. All voxels that are intersected by a facet will include at least one state that receives particles from the facet and at least one state that transfers particles to the facet. In most cases, additional voxels also will include such states.

Figure 13:
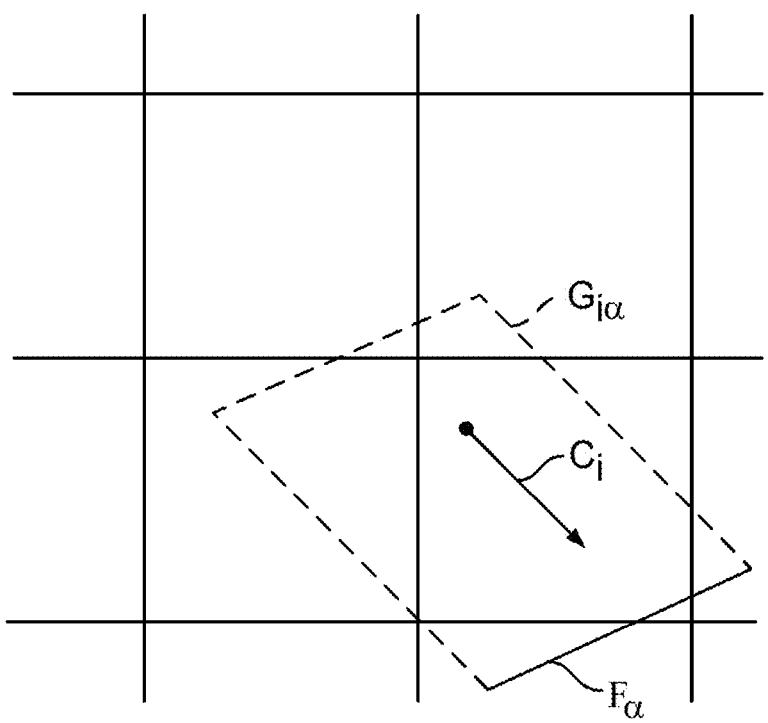
FIG. 13 illustrates regions affected by a facet of a surface (prior art).

Referring to FIG. 13, for each state i having a non-zero velocity vector $c_i$, a facet $F_\alpha$ receives particles from, or transfers particles to, a region defined by a parallelepiped $G_{i\alpha}$ having a height defined by the magnitude of the vector dot product of the velocity vector $c_i$ and the unit normal $n_\alpha$ of the facet ($|c_i n_i|$) and a base defined by the surface area $A\alpha$ of the facet so that the volume $V_{i\alpha}$ of the parallelepiped $G_{i\alpha}$ equals:

$$V_{i\alpha} = |c_i n_\alpha| A_\alpha\qquad\text{Eq.(I-6)}$$

The facet $F_\alpha$ receives particles from the volume $V_{i\alpha}$ when the velocity vector of the state is directed toward the facet ($|c_i n_i| < 0$), and transfers particles to the region when the velocity vector of the state is directed away from the facet ($|c_i n_i| > 0$). As will be discussed below, this expression must be modified when another facet occupies a portion of the parallelepiped $G_{i\alpha}$, a condition that could occur in the vicinity of non-convex features such as interior corners.

The parallelepiped $G_{i\alpha}$ of a facet Fa may overlap portions or all of multiple voxels. The number of voxels or portions thereof is dependent on the size of the facet relative to the size of the voxels, the energy of the state, and the orientation of the facet relative to the lattice structure. The number of affected voxels increases with the size of the facet. Accordingly, the size of the facet, as noted above, is typically selected to be on the order of or smaller than the size of the voxels located near the facet.

The portion of a voxel N(x) overlapped by a parallelepiped $G_{i\alpha}$ is defined as $V_{i\alpha}(x)$. Using this term, the flux $\Gamma_{i\alpha}(x)$ of state i particles that move between a voxel N(x) and a facet Fa equals the density of state i particles in the voxel ($N_i(x)$) multiplied by the volume of the region of overlap with the voxel ($V_{i\alpha}(x)$):

$$\Gamma_{i\alpha}(x) = N_i(x) V_{i\alpha}(x). \qquad \text{Eq.(I-7)}$$

When the parallelepiped $G_{i\alpha}$ is intersected by one or more facets, the following condition is true:

$$V_{i\alpha} = \Sigma V_\alpha(x) + \Sigma V_{i\alpha}(\beta) \qquad \text{Eq.(I-8)}$$

where the first summation accounts for all voxels overlapped by $G_{i\alpha}$ and the second term accounts for all facets that intersect $G_{i\alpha}$. When the parallelepiped $G_{i\alpha}$ is not intersected by another facet, this expression reduces to:

$$V_{i\alpha} = \Sigma V_{i\alpha}(x). \qquad \text{Eq.(I-9)}$$

Perform Simulation

Once the voxels that are affected by one or more facets are identified (step 304), a timer is initialized to begin the simulation (step 306). During each time increment of the simulation, movement of particles from voxel to voxel is simulated by an advection stage (steps 308-316) that accounts for interactions of the particles with surface facets. A collision stage (step 318) simulates the interaction of particles within each voxel. Thereafter, the timer is incremented (step 320). If the incremented timer does not indicate that the simulation is complete (step 322), the advection and collision stages (steps 308-320) are repeated. If the incremented timer indicates that the simulation is complete (step 322), results of the simulation are stored and/or displayed (step 324).

Process to Automatically Determine Axial Fan Rotation Direction

Figure 14:
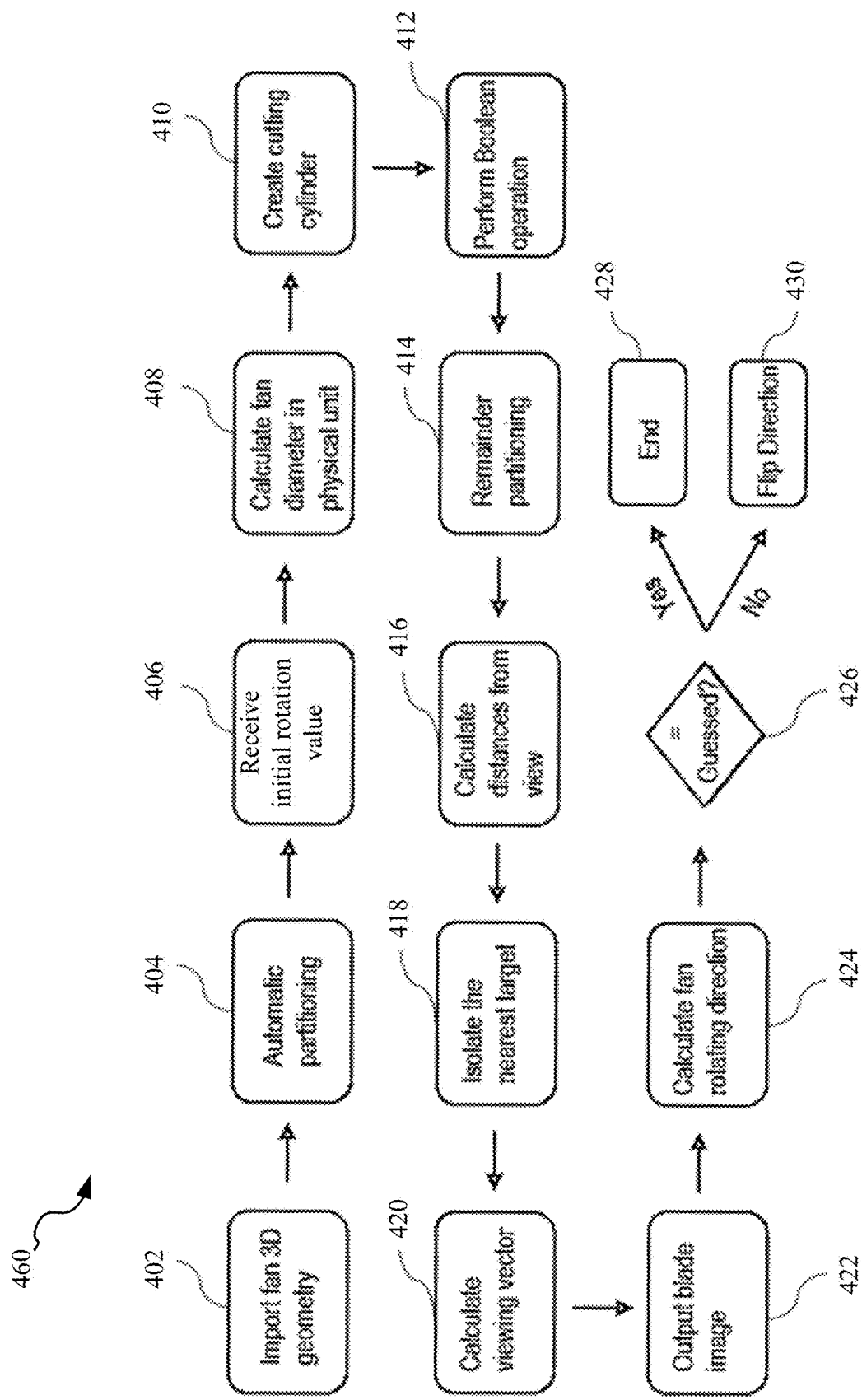
FIG. 14 is a flow diagram that shows an automated process for determining axial fan rotation direction.

FIG. 14 depicts an exemplary embodiment of the direction determination process 55, whereas FIGS. 15A-15F depict diagrams of aspects of the axial fan derived from the direction determination process 55, and which would be helpful in understanding direction determination process 55.

Axial Fan Characteristics

Figure 15A:
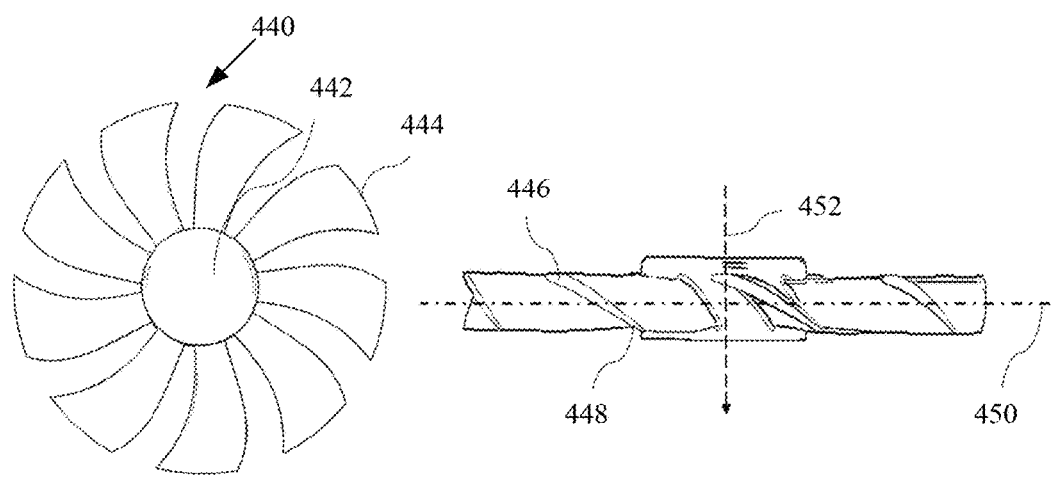
FIGS. 15A-15F are figures useful in understanding the automated process of FIG. 14.

Referring momentarily to FIG. 15A, this figure diagrammatically illustrates a typical axial cooling fan 440. In FIG. 15A, a front view of the axial cooling fan is displayed on the left side and a top view of the axial cooling fan is displayed on the right side of FIG. 15A. In the front view (left-side of FIG. 15A) and the top view (right-side of FIG. 15A) are shown blades 442 and a motor (portion) 444 of the axial cooling fan. Similar to an airfoil, a fan blade has a leading edge 446 that first contacts the fluid and trailing edge 408 where the fluid separates. When the fan rotates along a central plane 450, the fluid flows from the leading edge 446 toward the trailing edge 448. The bulk fluid moves in the direction indicated by 452.

FIG. 15A illustrates how fluid flow moves from the axial fan leading edge to the axial fan trailing edge of a fan blade. The axial fan rotates in such a direction that the leading edge is encountering the fluid flow before the trailing edge (i.e., the leading edge is encountering the fluid flow first.) The discussion below seeks to determine which side of a fan blade is the leading side of the fan blade. Once the leading side of the fan blade is determined, then the axial fan rotation direction will be that direction that the leading side touches the fluid first. (Alternatively, the process could be used to determine the trailing side region of the centerline, and the actual fan rotational direction would be the rotation direction at which the trailing side region enters the fluid last.)

Referring now to FIG. 14 an embodiment of the direction determination process 55 that automatically determines the axial cooling fan rotating direction is shown. The process 55 uses an image processing method that analyzes a complex 3D (three dimensional) geometry of the axial fan that is "projected" into a 2D (two dimensional) domain representation of the axial fan (See FIG. 15A) that contains a profile view of one single blade (See FIG. 15B.) To automatically generate an image that only contains the profile view of one single blade, and to perform the profile analysis automatically, the direction determination process 55 imports 402 a 3D digital axial fan geometry representation, e.g. from a computer aided design (CAD) application (not shown), with the representation having predefined identifiers (e.g., names, etc.) for fan blades and the fan motor. The direction determination process 55 partitions 404 the imported representation into fan blades and fan motor and assigns the fan blades and the motor to corresponding segments.

The direction determination process 55 receives 406 an assumed initial fan rotating direction (either clockwise or counterclockwise) that is used as an initial rotation direction value for the process 55. The direction determination process 55 includes a normalization process that includes calculating fan diameter 408 that is expressed in physical units (e. g. units of measurement). The direction determination process 55 normalization encloses the fan in a water-tight cylindrical revolution volume. The diameter of the fan, in physical units, is calculated 408 from measuring the size of the enclosing water-tight cylindrical revolution volume. The calculated fan diameter value is used to normalize other parameters so that the process is not dependent on the size of the fan.

The direction determination process 55 produces 410 a cutter ring, e.g., a hollow cylindrical ring 502. A Boolean operation is performed 412 between the ring 502 (FIG. 15E) and the fan geometry (e.g., the 3D representation of a CAD representation, as discussed above), so that overlapped parts 504 are obtained. Typically, in order to find these overlapped parts a Boolean "AND" operation can be performed with the ring 502 and the fan geometry. These overlapping parts are remainders of the outer regions of the fan blades. The objective is to isolate only the outer region 506 (FIG. 15B) of one single blade. To achieve this objective, these remainders are automatically partitioned in step 414 so that each remainder piece has a unique ID. The process shows one remainder piece of the automatically partitioned remainders, and hides all other remainder pieces. For those axial fans that have a ring attached to the fan blade by the manufacturer for performance purpose, the cutting location used by the cutter ring, e.g., the hollow cylindrical ring 502, is adjusted accordingly so that the ring attached to the fan blade will not affect the blade shape view.

The system calculates 416 a remainder piece that is closest to a "viewer," and isolates 418 that selected fan blade from other remainder pieces. Alternative embodiments include picking furthest blade piece instead of the closest blade piece relative to a "viewer," picking the most left-side or most right-side blade piece, or specifying an angle relative to a reference vector, for example, an assumed fan rotation axis vector, as a filter to select the targeted blade piece.

The direction determination process 55 calculates 420 a virtual viewing position and the view direction as a function of the fan diameter and orientation so that the desired angle of viewing the targeted blade profile 508 (FIG. 15E) is achieved. As with at least some of the other items in FIG. 14, the sequence of items 418 and 420 is interchangeable. In any event, an image showing only the profile of one blade with the optimized viewing angle is outputted in step 422.

Figure 15B:
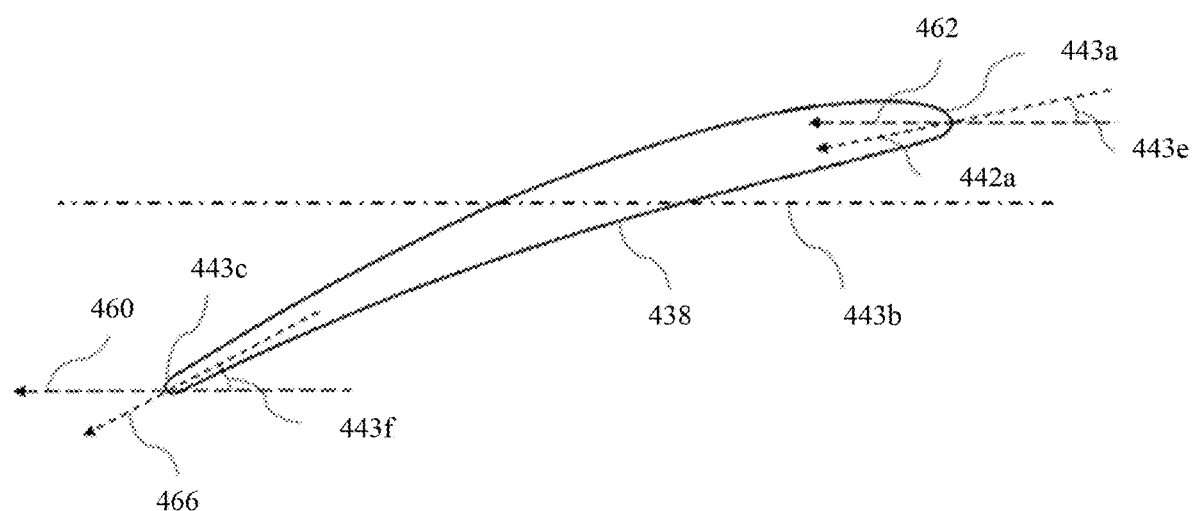
Figure 15C:
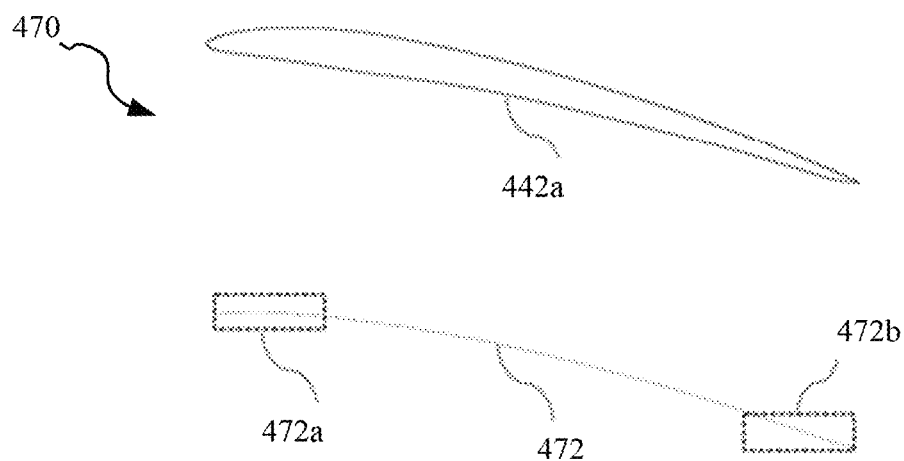

Referring to FIG. 15C, the centerline is extracted by the system as is diagrammatically shown. The centerline extraction technique 470 obtains data (upper and lower edges, leading edge and trailing edge and angle with respect to a reference, e.g., a horizontal plane/line) that represents the positioning of the isolated blade 442a and from that data determines the centerline 472 as the line that is equidistant from edges in the view and that traverses equidistant through leading and trailing regions 472a, 472b and simplifies the numerical analysis process (FIG. 14) for analyzing a single axial fan blade profile.

To further simplify the numerical analysis process, the centerline extraction technique 440 extracts from the representation of the blade of the axial fan, the center line 472 of a blade profile view 424. The slope $$\frac{\Delta y}{\Delta x}$$

of the centerline 472 at a leading side region 472a and at a trailing side region 472b of the centerline 472 can be compared to determine fan rotating direction and fluid moving direction. That is, the side of the blade profile view having a lower value of the slope, e.g., is more "flatter" is designated as the leading side of the fan blade view. The axial fan will be rotating in a particular direction (either clockwise or counterclockwise) so that the determined leading side "touches" the fluid first. The calculated direction is the actual result from the direction determination process 55.

In some instances, a checking step is performed 426. If the calculated result from 424 is the same as the received 406 initial value of rotation, the process can terminate at step 428. If the result is not the same as the guessed value of rotation, then the guessed value is incorrect, the fan rotating direction is in the direction opposite to that of the guessed value, and the system can "flip," i.e., change the rotation direction in step 430, in other words, the system provides the calculated rotation direction, as the actual result from the direction determination process 55, as mentioned above. The fluid moving direction can is also determined at the same time in the local coordinate system. The calculated fluid moving vector can be translated to any other coordinate systems as needed. This approach is independent of the orientation of the blade profile. The direction determination process 55 thus calculates rotation direction from an outputted image position information of a centerline 510 (FIG. 15E) of the outputted image by calculating an average valve of upper and lower portions 510a, 510b of the fan blade edges. This calculation is thus simplified by analyzing only the shape of the centerline 510 instead of the whole blade profile.

FIG. 15B illustrates characteristics of the leading and trailing edges of a typical axial cooling fan blade. To maximize efficiency and optimize performance, a typical axial cooling fan blade 442a as shown in FIG. 15B is designed in such a way that its leading side 443a is more "flatter" relative to the fan rotation plane 443b compared to that for the trailing side 443c. That is, the angle 443e is smaller than the angle 443f. Angle 443e is defined by as the angle between the averaged blade profile center line 442a at the leading side and an imaginary line 462 that is parallel to the rotation plane 464. Similarly, 443f is defined by the angle between the averaged blade profile center line 466 at the trailing edge and the imaginary line 460 that is parallel to the rotation plane 464. In this configuration the leading edge will receive less fluid resistance when cutting through fluid and the trailing edge will direct the flow moving toward the designed for a flow direction.

Remainder Method for Isolation of Blade

Figure 15D:
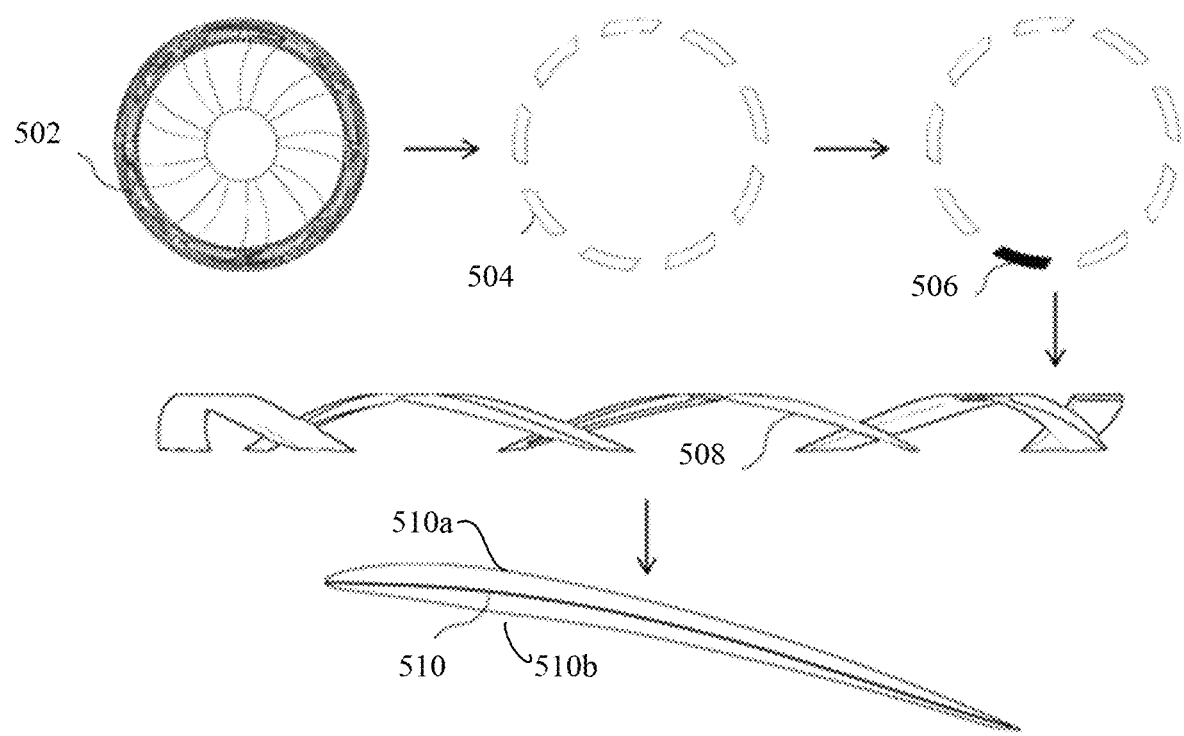

FIG. 15D shows the hollow cylindrical ring 502 produced from the fan image (FIG. 15A). The size of the hollow cylindrical ring 502 is a function of the fan diameter, discussed above. FIG. 15D also shows results of performing the Boolean operation between the ring 502 and the fan geometry (e.g., the CAD representation discussed above) so that overlapped parts 504 are obtained. Typically, in order to find these overlapped parts a Boolean "AND" operation can be performed with the ring 502 and the fan geometry. These overlapping parts are remainders of the outer regions of the fan blades. The objective is to isolate only the outer region 506 (FIG. 15E) of one single blade profile 508. From this the centerline 510a is calculated as a line equidistant between top and bottom edges 510a, 510b and leading and trail edges, as shown.

As discussed above in FIG. 14, in order to isolate one outer region of one fan blade, these remainders are automatically partitioned in step 474 so that each remainder piece has a unique ID. The process shows one remainder piece of the automatically partitioned remainders, and hides all other remainder pieces.

Ray Tracing Method

Figure 15E:
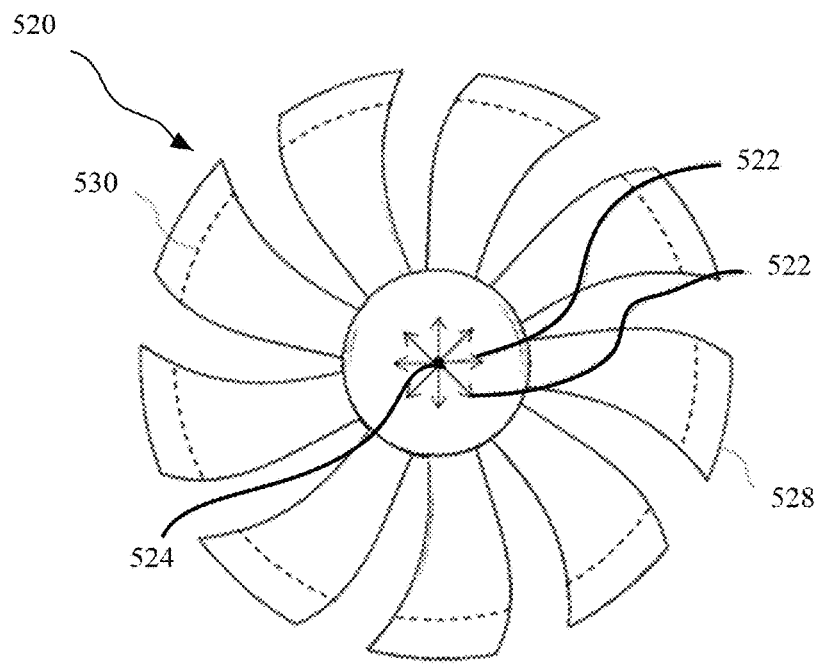
Figure 15F:
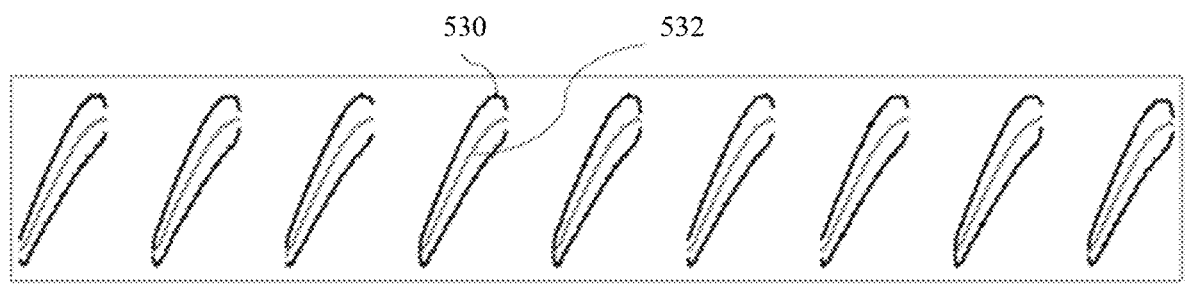

Referring to FIG. 15E, an alternative embodiment that uses a ray tracing process 520 to obtain the single axial cooling fan blade image is shown. This ray tracing process 520 to obtain the described fan blade profile involves the system emitting through the representation of the axial fan multiple rays 522 (rays or ray as used herein is a geometric concept, e.g., a line with a single endpoint (or point of origin) that extends infinitely in one direction) from the center 524 of the fan 528 as shown in FIG. 15F. These rays form a circular wave 530 propagating in the radial direction. The tracing process has the system record a zero value or signal whenever the wave does not hit a solid portion, such as the blades of the fan and the system records a non-zero value or signal whenever the wave hits solid objects such as the blades. The generated signal is presented in FIG. 15F.

Referring to FIG. 15F, an example image that is generated by the ray tracing process 500 shows the profiles of all of the blades of the axial fan. In this process, all blade profiles are recorded, and the centerlines of the blades are calculated automatically. For example, 532 represents the centerline of the blade 530. The slope calculation described in FIG. 15C is performed on every single blade. The trailing and leading sides are determined by evaluating the results from all blades. The rotation direction is determined by using a voting method, e.g., determining a maximum of a number of the blade profiles that are in agreement with rotation direction. This maximum is used to assess whether the initial rotation direction was correct or incorrect, similar to that discussed in FIG. 15D.

The disclosed embodiments may offer one or more of following advantages over existing solutions: The process is automated while the existing solutions are typically manual processes. The automated process may have a relatively higher accuracy rate in comparison to manual visual estimating approaches, which can be highly dependent on the skill of the person who performs the estimation. The process can determine rotating direction relatively quickly in comparison to the manual process that may take longer depending on the expertise level of the inspecting person and the complexity of the fan. The disclosed embodiments can automatically calculate the airflow direction in the local coordinate system using the detected rotation direction and pass this information to the numerical simulation. Manual estimating approaches would likewise require a manual input of airflow direction for the numerical simulation.

Embodiments of the subject matter and the functional operations described in this specification can be implemented in digital electronic circuitry, tangibly-embodied computer software or firmware, computer hardware (including the structures disclosed in this specification and their structural equivalents), or in combinations of one or more of them. Embodiments of the subject matter described in this specification can be implemented as one or more computer programs (i.e., one or more modules of computer program instructions encoded on a tangible non-transitory program carrier for execution by, or to control the operation of, data processing apparatus). The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example, a programmable processor, a computer, or multiple processors or computers. The apparatus can also be or further include special purpose logic circuitry (e.g., an FPGA (field programmable gate array) or an ASIC (application-specific integrated circuit)). In addition to hardware, the apparatus can optionally include code that creates an execution environment for computer programs (e.g., code that constitutes processor firmware, a protocol stack, a database management system, an operating system, or a combination of one or more of them).

A computer program, which can also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document, in a single file dedicated to the program in question, or in multiple coordinated files (e.g., files that store one or more modules, sub-programs, or portions of code)). A computer program can be deployed so that the program is executed on one computer or on multiple computers that are located at one site or distributed across multiple sites and interconnected by a data communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry (e.g., an FPGA (field programmable gate array) or an ASIC (application-specific integrated circuit)).

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data (e.g., magnetic, magneto-optical disks, or optical disks), however, a computer need not have such devices. Moreover, a computer can be embedded in another device (e.g., a mobile telephone, a personal digital assistant (PDA), a mobile audio or video player, a game console, a Global Positioning System (GPS) receiver, or a portable storage device (e.g., a universal serial bus (USB) flash drive), to name just a few).

Computer-readable media suitable for storing computer program instructions and data include all forms of non-volatile memory on media and memory devices, including by way of example semiconductor memory devices (e.g., EPROM, EEPROM, and flash memory devices), magnetic disks (e.g., internal hard disks or removable disks), magneto-optical disks, and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback) and input from the user can be received in any form, including acoustic, speech, or tactile input. In addition, a computer can interact with a user by sending documents to and receiving documents from a device that is used by the user, for example, by sending web pages to a web browser on a user's device in response to requests received from the web browser.

Embodiments of the subject matter described in this specification can be implemented in a computing system that includes a back-end component (e.g., as a data server), or that includes a middleware component (e.g., an application server), or that includes a front-end component (e.g., a client computer having a graphical user interface or a web browser through which a user can interact with an implementation of the subject matter described in this specification), or any combination of one or more such back-end, middleware, or front-end components. The components of the system can be interconnected by any form or medium of digital data communication (e.g., a communication network). Examples of communication networks include a local area network (LAN) and a wide area network (WAN) (e.g., the Internet).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a user device (e.g., for purposes of displaying data to and receiving user input from a user interacting with the user device), which acts as a client. Data generated at the user device (e.g., a result of the user interaction) can be received from the user device at the server.

While this specification contains many specific implementation details, these should not be construed as limitations on the scope of any invention or on the scope of what can be claimed, but rather as descriptions of features that can be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing can be advantageous.

What is claimed is:

1. A computer-implemented method, for using image processing for determining a fan rotational direction, comprises:
   receiving, by a computer processing system, digital data of a three dimensional representation of an axial fan having plural fan blades;
   determining, by the computer processing system, a viewing angle of the three dimensional representation of the axial fan relative to a reference vector;
   orienting, by the computer processing system, a virtual viewing position of the three dimensional representation of the axial fan to align with the determined viewing angle;
   generating, by the computer processing system, a digital image of at least a single blade of the plural fan blades of the axial fan as viewed from the virtual viewing position, the digital image representing a two dimensional projection of the three dimensional representation of the axial fan;
   processing, by the computer processing system, the digital image to extract data representing a profile of the single blade;
   identifying, by the computer processing system, a first edge and a second edge based on the profile of the single blade represented by the extracted data; and
   determining, by the computer processing system based on the first and second edges represented by the extracted data, the fan rotational direction.

2. The method of claim 1 wherein determining the fan rotational direction, comprises:
   partitioning, by the computer processing system, received data into a first partition corresponding to a fan blade segment and a second partition corresponding to a motor segment.

3. The method of claim 2 wherein determining the fan rotational direction, further comprises:
   determining, by the computer processing system from the partitioned data, a single blade based on the viewing angle;
   extracting, by the computer processing system, a centerline from the single blade;
   calculating, by the computer processing system, slopes of edges of the blade to determine a leading side region and a trailing side region of the centerline; and
   setting, by the computer processing system, the fan rotational direction, according to the calculated slopes.

4. The method of claim 3 wherein generating a digital image of the single blade comprises:
   calculating an axial fan diameter;
   generating a cutter ring according to the calculated axial fan diameter;
   identifying overlapping parts of the axial fan by applying a Boolean function to the cutter ring and the calculated fan diameter to isolate overlapping parts and provide remainder portions of outer regions of the plural fan blades and isolate an outer region of the single blade; and
   partitioning the remainder portions so that each remainder portion is assigned a unique identification.

5. The method of claim 1 wherein determining the fan rotational direction comprises:
   causing the computer processing system to radially project a plurality of rays from the center of the axial fan.

6. The method of claim 5 wherein determining the fan rotational direction further comprises:
   recording, by the computer processing system, a non-zero signal for each instance where a projected ray intersects a solid surface of the two dimensional representation of the axial fan.

7. The method of claim 6 wherein determining the fan rotational direction further comprises:
   calculating by the computer processing system, centerlines of the blades from the non-zero signals;
   performing a slope calculation on each blade to determine trailing and leading edges of the blades; and
   determining fan rotational direction according to the determined trailing and leading edges.

8. The method of claim 1, further comprises:
   simulating a physical fluid flow process in a flow volume that includes the representation of the axial fan according to the determined fan rotational direction; and
   wherein the fan rotational direction is determined by setting the rotational direction as the direction in which the first edge enters the fluid first or as the rotational direction in which the second edge enters the fluid last.

9. A computer system comprising:
   one or more processors; and
   memory operatively coupled to the one or more processors;
   a computer readable storage medium that stores executable computer instructions, for using image processing for determining a fan rotational direction with the executable computer instructions causing the computer system to:
   receive digital data of a three dimensional representation of an axial fan having plural fan blades;

determine a viewing angle of the three dimensional representation of the axial fan relative to a reference vector;

orient a virtual viewing position of the three dimensional representation of the axial fan to align with the determined viewing angle;

generate a digital image of at least a single blade of the plural fan blades of the axial fan as viewed from the virtual viewing position, the digital image representing a two dimensional projection of the three dimensional representation of the axial fan;

process the digital image to extract data representing a profile of the single blade;

identify a first edge and a second edge based on the profile of the single blade represented by the extracted data; and determine based on the first and second edges represented by the extracted data, the fan rotational direction.

10. The computer system of claim 9 wherein instructions to determine the fan rotational direction comprise instructions to:

partition received data into a first partition corresponding to a fan blade segment and a second partition corresponding to a motor segment.

11. The computer system of claim 10 wherein instructions to determine the fan rotational direction, further comprise instructions to:

determine from the partitioned data, a single blade based on the viewing angle;

extract a centerline from the single blade;

calculate slopes of edges of the blade to determine a leading side region and a trailing side region of the centerline; and set the fan rotational direction according to the calculated slopes.

12. The computer system of claim 9 wherein instructions to generate a digital image of the single blade comprise instructions to:

calculate an axial fan diameter;

generate a cutter ring according to the calculated axial fan diameter;

identify overlapping parts of the axial fan by applying a Boolean function to the cutter ring and the calculated fan diameter to isolate overlapping parts and provide remainder portions of the plural fan blades and isolate an outer region of the single blade; and partition the remainder portions so that each remainder portion is assigned a unique identification.

13. The computer system of claim 9 wherein instructions to determine the fan rotational direction further comprise instructions to:

cause the system to radially project a plurality of rays from the center of the axial fan.

14. The computer system of claim 13 wherein instructions to determine the fan rotational direction further comprise instructions to:

record a non-zero signal for each instance where a projected ray intersects a solid surface of the two dimensional representation of the axial fan.

15. The computer system of claim 14 wherein instructions to determine the fan rotational direction further comprise instructions to:

calculate by the system, centerlines of the blades from the non-zero signals;

perform a slope calculation on each blade to determine trailing and leading edges of the blades; and determine fan rotational direction according the determined trailing and leading edges.

16. A computer program product stored on a non-transitory computer readable medium storing executable computer instructions for using image processing for determining axial fan rotational direction, the instructions causing a computer system to:

receive digital data of a three dimensional representation of an axial fan having plural fan blades;

determine a viewing angle of the three dimensional representation of the axial fan relative to a reference vector;

orient a virtual viewing position of the three dimensional representation of the axial fan to align with the determined viewing angle;

generate a digital image of at least a single blade of the plural fan blades of the axial fan as viewed from the virtual viewing position, the digital image representing a two dimensional projection of the three dimensional representation of the axial fan;

process the digital image to extract data representing a profile of the single blade;

identify a first edge and a second edge based on the profile of the single blade represented by the extracted data; and determine based on the first and second edges represented by the extracted data, the fan rotational direction.

17. The computer program product of claim 16 wherein instructions to determine the fan rotational direction comprise instructions to:

partition received data into a first partition corresponding to a fan blade segment and a second partition corresponding to a motor segment.

18. The computer program product of claim 17 wherein instructions to determine the fan rotational direction, further comprise instructions to:

determine from the partitioned data, the single blade based on the viewing angle, by instructions to:

generate a cutter ring according to a calculated axial fan diameter;

identify overlapping parts of the axial fan by applying a Boolean function to the cutter ring and the calculated fan diameter to isolate overlapping parts and provide remainder portions of outer regions of the plural fan blades and isolate an outer region of the single blade;

partition the remainder portions, so that each remainder portion has a unique identification;

extract a centerline from the single blade;

calculate slopes of edges of the single blade to determine a leading side region and a trailing side region of the centerline; and set the fan rotational direction according to the calculated slopes.

19. The computer program product of claim 16 wherein instructions to determine the fan rotational direction comprise instructions to:

cause the system to radially project a plurality of rays from the center of the axial fan.

20. The computer program product of claim 19 wherein instructions to determine the fan rotational direction comprise instructions to:

record a non-zero signal for each instance where a projected ray intersects a solid surface of the two dimensional representation of the axial fan;

calculate by the system, centerlines of the blades from the non-zero signals;

perform a slope calculation on each blade to determine trailing and leading edges of the blades; and determine the fan rotational direction according to the determined trailing and leading edges.

* * * * *

UNITED STATES PATENT AND TRADEMARK OFFICE
CERTIFICATE OF CORRECTION

| | | |
|---|---|---|
| PATENT NO. | : 11,835,054 B2 | Page 1 of 1 |
| APPLICATION NO. | : 16/829247 | |
| DATED | : December 5, 2023 | |
| INVENTOR(S) | : Huhu Wang et al. | |

It is certified that error appears in the above-identified patent and that said Letters Patent is hereby corrected as shown below:

In the Claims

Column 24, Line 1 (Claim 15), after "according" insert --to--.

Signed and Sealed this
Thirtieth Day of January, 2024

Katherine Kelly Vidal
*Director of the United States Patent and Trademark Office*